United States Patent

[11] 3,558,853

[72] Inventor Gary L. Schluntz
     Penfield, N.Y.
[21] Appl. No. 824,540
[22] Filed May 14, 1969
[45] Patented Jan. 26, 1971
[73] Assignee Xerox Corporation
     Rochester, N.Y.
     a corporation of New York

[54] FUSER SYSTEM FOR COPYING MACHINE
    5 Claims, 54 Drawing Figs.
[52] U.S. Cl. .................................................. 219/216,
     219/388, 219/497, 219/505
[51] Int. Cl. .................................................. G03g 13/20
     H05b 1/02
[50] Field of Search .......................................... 219/216,
     388, 497, 504, 505

[56] References Cited
UNITED STATES PATENTS

| | | | |
|---|---|---|---|
| 1,896,953 | 2/1933 | Hassell | 165/46 |
| 1,905,439 | 4/1933 | Carleton | 219/297X |
| 2,259,401 | 10/1941 | Tucker et al. | 219/297 |
| 2,418,283 | 4/1947 | Wilson | 219/354X |
| 2,511,635 | 6/1950 | Holmes | 219/297 |
| 2,710,908 | 6/1955 | Doniak | 219/298X |
| 2,753,435 | 7/1956 | Jepson | 219/212X |
| 2,825,791 | 3/1958 | Jackson | 219/365X |
| 2,982,841 | 5/1961 | MacCracken | 219/212X |
| 3,227,208 | 1/1966 | Potter et al. | 219/325(UX) |
| 3,402,709 | 9/1968 | Shivers et al. | 165/46X |

FOREIGN PATENTS

| | | | |
|---|---|---|---|
| 402,088 | 11/1933 | Great Britain | 128/400 |
| 861,633 | 2/1961 | Great Britain | 219/321 |
| 1,072,376 | 6/1967 | Great Britain | 219/528 |

Primary Examiner—Joseph V. Truhe
Assistant Examiner—Peter W. Gowdey
Attorneys—Paul M. Enlow, Norman E. Schrader, James J. Ralabate, Ronald Zibelli and Melvin A. Klein ABSTRACT: Fusing apparatus for heating developed images on copy sheets moving through an automatic copying machine at variable rates including a conveyor for transporting copy sheets having fusible images thereon at variable rates past a plurality of heater elements, a first circuit for generating ramp signals at a predetermined duration, and a second circuit including a thermistor responsive to changes in temperature and at least two voltage dividing networks each corresponding to a different fusing temperature. A zero cross pulse generator and comparator responsive to input signals from said first and second circuits emits signals when the output signals of said first circuit means exceeds that of said second means and a third circuit including at least one triac coupled to at least a portion of said heater elements receives signals from said zero cross pulse generator and comparator and applies power to said heater elements in accordance with a preselected copy travel rate.

INVENTOR.
GARY L. SCHLUNTZ

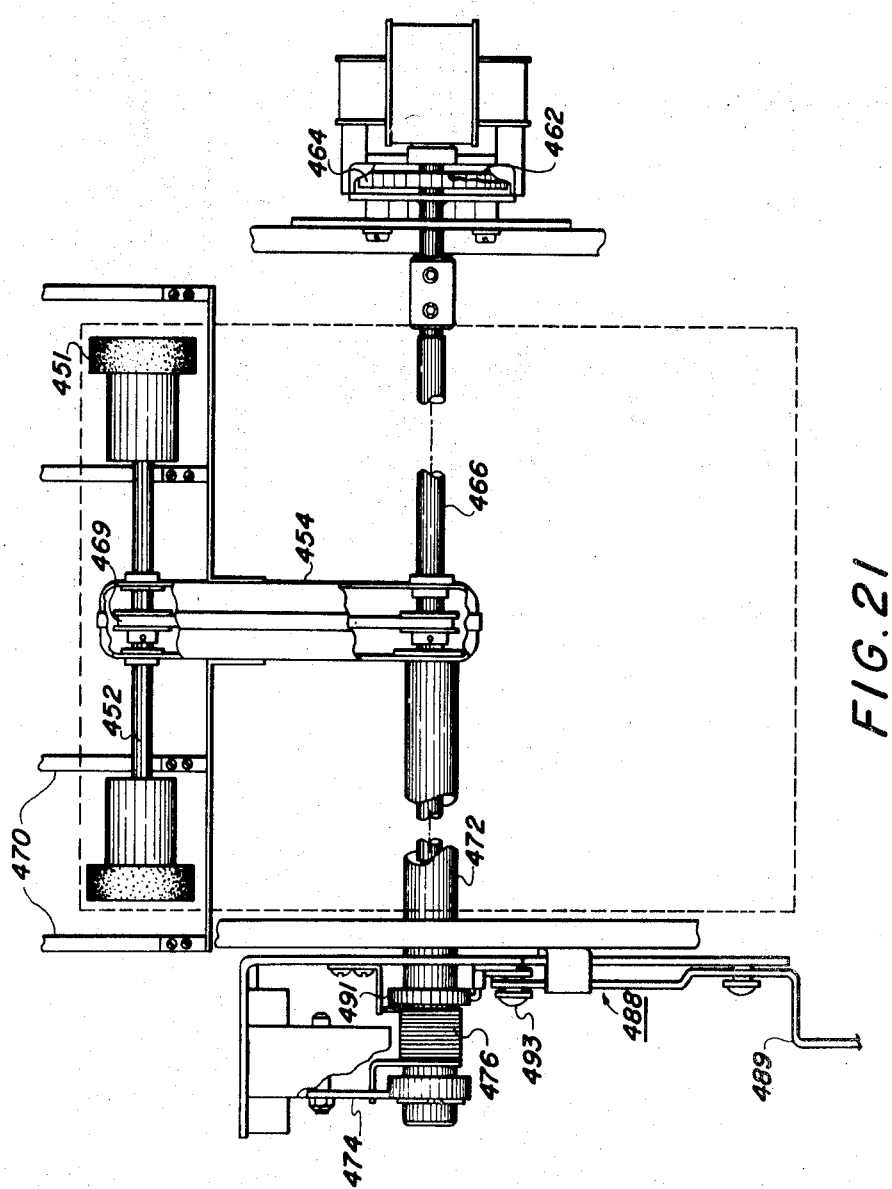

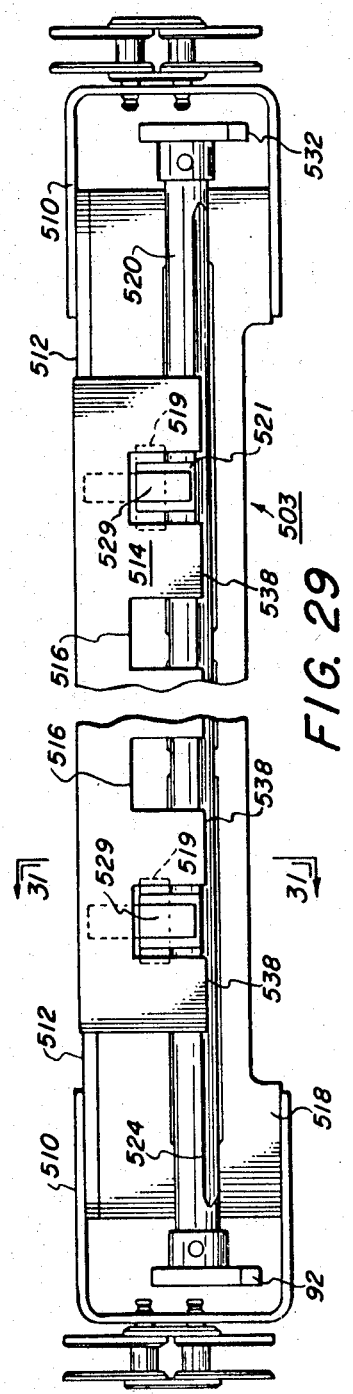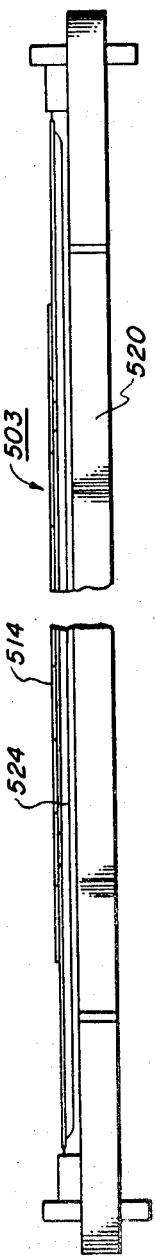
FIG. 29
FIG. 30

FUSER SYSTEM FOR COPYING MACHINE

This invention relates to improvements in automatic copying machines and, particularly, to improvements in fuser systems for fusing developed images moved through automatic copying machines for producing enlarged copies of microfilm frames mounted in aperture cards.

As is well known, in recent years, the steadily increasing size of various industries and the scientific information available to the government has required an enormous increase in the number and variety of business technical records and engineering drawings that must be made, maintained, and kept available for use. Prior to the advent of the aperture card, data processing systems utilizing more laborious and expensive methods for record keeping were employed. However, the increasing enormity of record making and printout operations made this phase of data processing increasingly expensive and burdensome to the point that is was becoming economically unfeasible to continue by conventional techniques.

Generally, in the aperture card data processing system records are maintained under conditions of relative security from destruction and, at the same time, be available for day-to-day use. This system is generally known as a "unitized" microfilm system and comprises the basic steps of (1) copying onto microfilm original drawings, tracings, memoranda, reports, or other records likely to require reproduction at a later date, etc.; (2) mounting the individual microfilm frames into the apertures of microfilm data processing cards, which may be designated by coded perforation for use in conventional card-controlled machines; and (3) using such microfilm cards for the reproduction of the film information thereon.

When a microfilm of data to be reproduced is so mounted in an aperture card, the card may also be code punched with information defining, identifying, or relating to the microfilm frame. Thereafter, these cards may be manually or machine sorted and otherwise processed in accordance with conventional uses of such cards. A typical reproduction system for reproducing these cards is disclosed in U.S. Pat No. 3,206,193 to Allen et al.

While the use of image bearing frames of microfilm mounted as inserts in apertures of cards has gained wide acceptance as a means of storing and recording information, the system is not entirely satisfactory. An important shortcoming is that microfilm reproduction systems for aperture cards are limited to laborious and time-consuming reproduction techniques that detract substantially from the overall efficiency of the system.

With the present invention it is possible to reproduce information from aperture cards conveniently, economically, and at different rates that contribute substantially to the utility and effectiveness of the system. Generally speaking, this is effected by means of an automatic multiple-speed recording system capable of feeding microfilm cards in seriatim, past a scan station which optically scans their images one or more times and reproduces the images on different size cut sheets which are moved past fuser apparatus capable of selectively heating the images irrespective of the sheet travel rate and sheet size. More than this the system enables reproducing either line or tonal images at the option of a machine operator.

Therefore, it is an object of this invention to improve automatic recording systems.

It is another object of this invention to facilitate the reproduction of enlarged copies from microfilm frames mounted in aperture cards.

It is another object of the invention to enable multiple-speed operation of an aperture card reproduction system wherein enlarged copies of film images are produced onto cut sheet paper.

It is another object of this invention to enable reproducing film images onto different size copy sheets according to the film image size so that no waste of copy sheet results.

It is another object of this invention to effect the reproduction of line or tonal film images in an automatic recording system capable of variable reproduction rates.

It is another object of this invention to enable automatic heating of developed images on copy sheets moving through an automatic copying at variable rates at a temperature level which fuses the image to the associated sheet without scorching the sheet.

It is another object of this invention to improve control circuits for controlling energization of heater elements to fuse images on sheet material transported at varied rates and/or where the sheet material is of varied size and thickness.

It is another object of this invention to improve thermistor fuser control circuits to enable using circuits of this type in multiple output reproduction machines.

These and other objects of the invention are attained by an improved xerographic copying/duplicating system having an improved control circuit to apply power to heater elements to fuse developed images in accordance with a preselected copy travel rate. Also the control circuit is operative to fuse images on different sheet stock and sheet size. It will be greatly appreciated that such a system lends itself especially to the reproduction of enlarged engineering drawings as, for example, A, B, C, etc. from aperture cards.

For better understanding of the invention as well as other objects and further features thereof, reference is made to the following detailed description of the invention to be read in connection with the accompanying drawings wherein.

Figure 20:
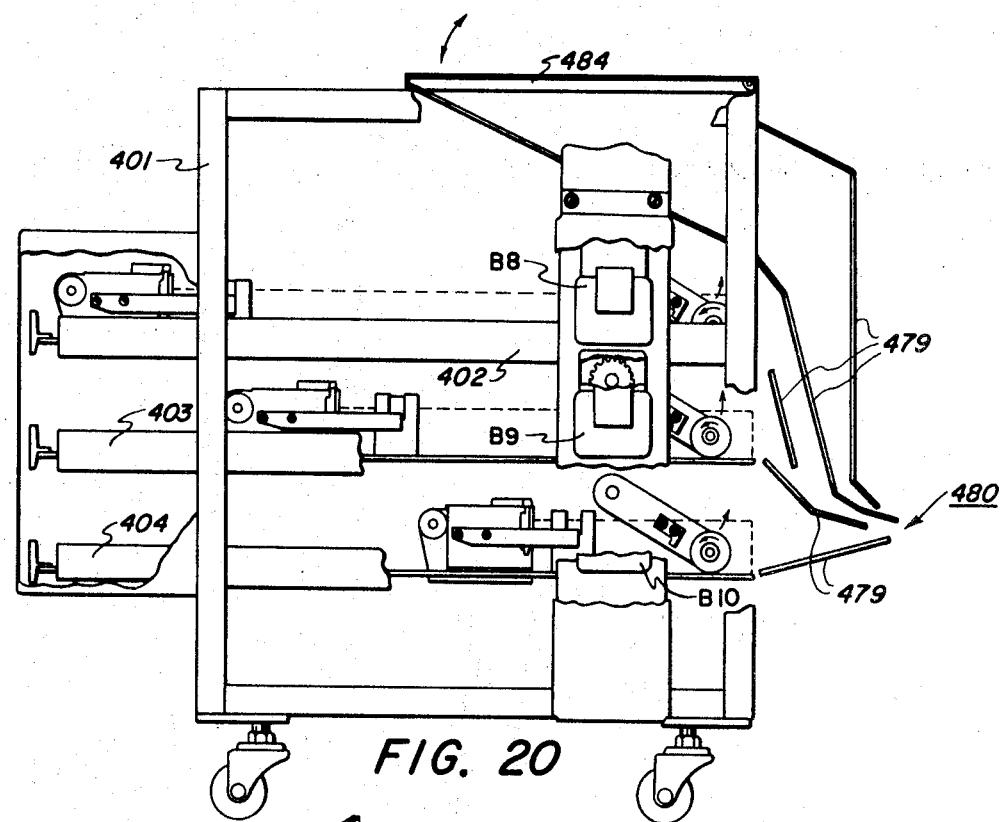
FIG. 20 is a side sectional view of the sheet feed apparatus of the recording apparatus with parts broken away to show details thereof.
Figure 20A:
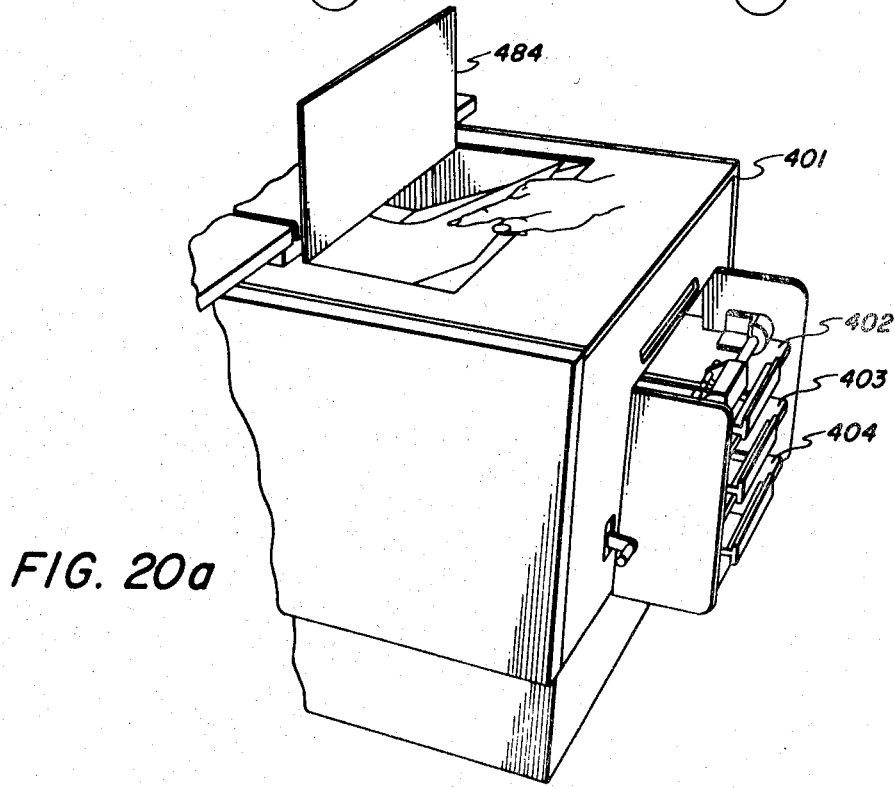
Figure 23:
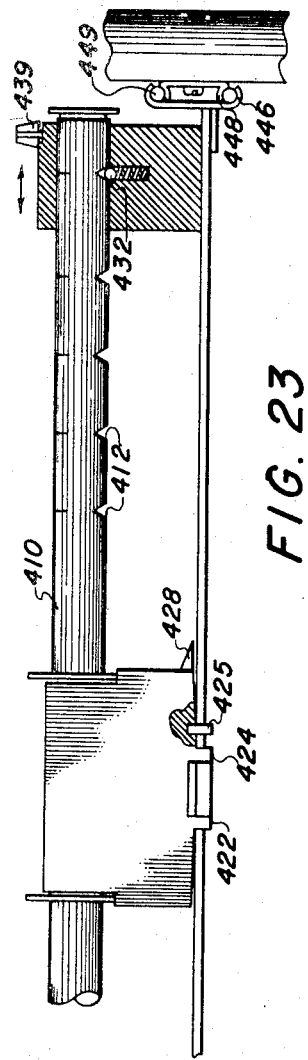
Figure 22:
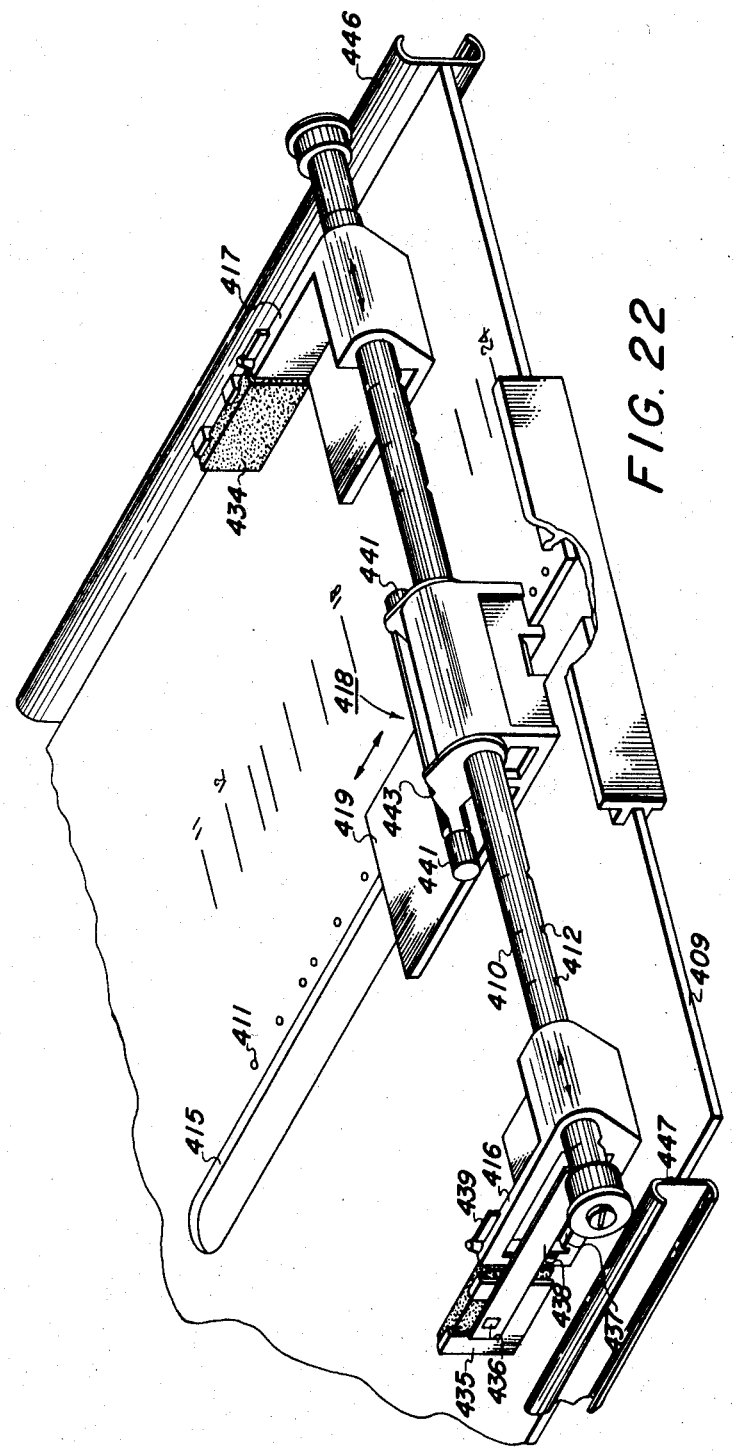
Figure 24:
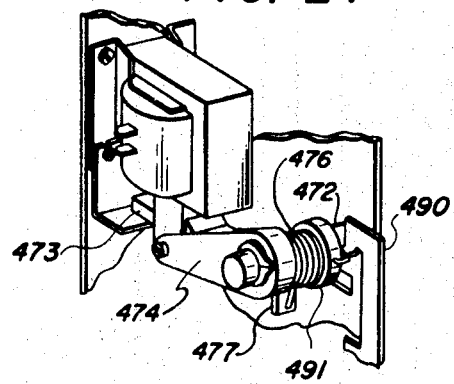
Figure 25:
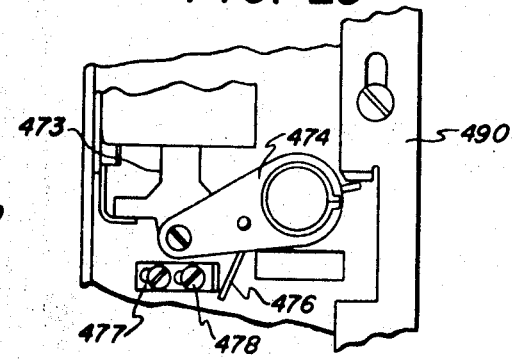
Figure 26:
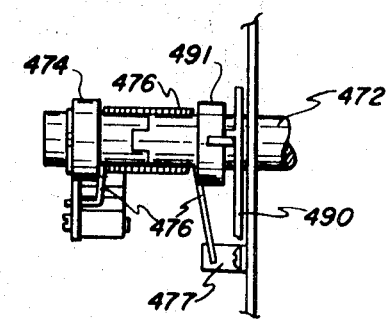
Figure 27:
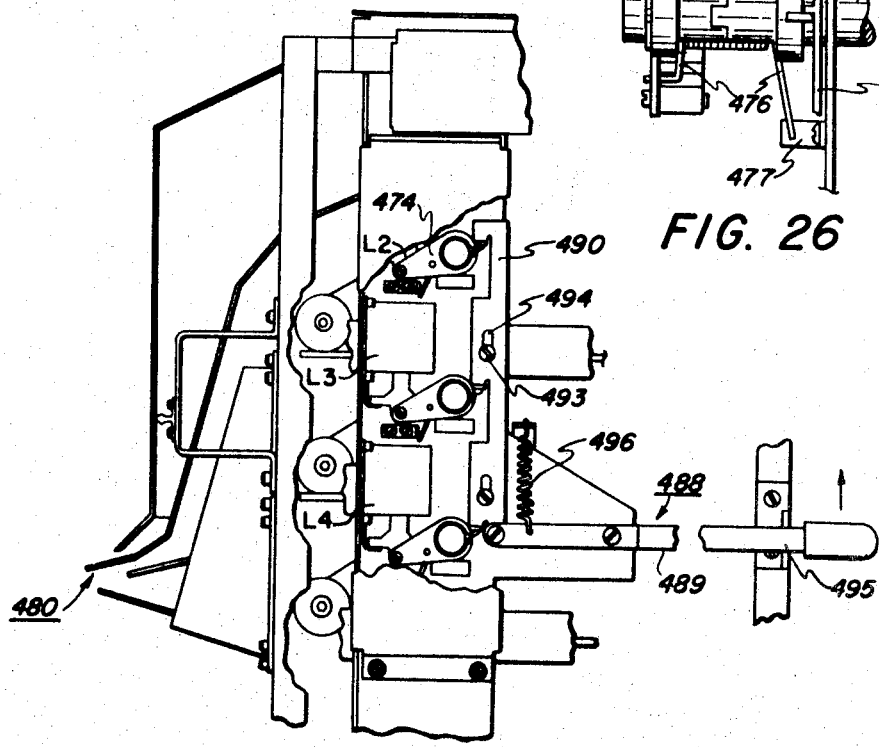
Figure 28:
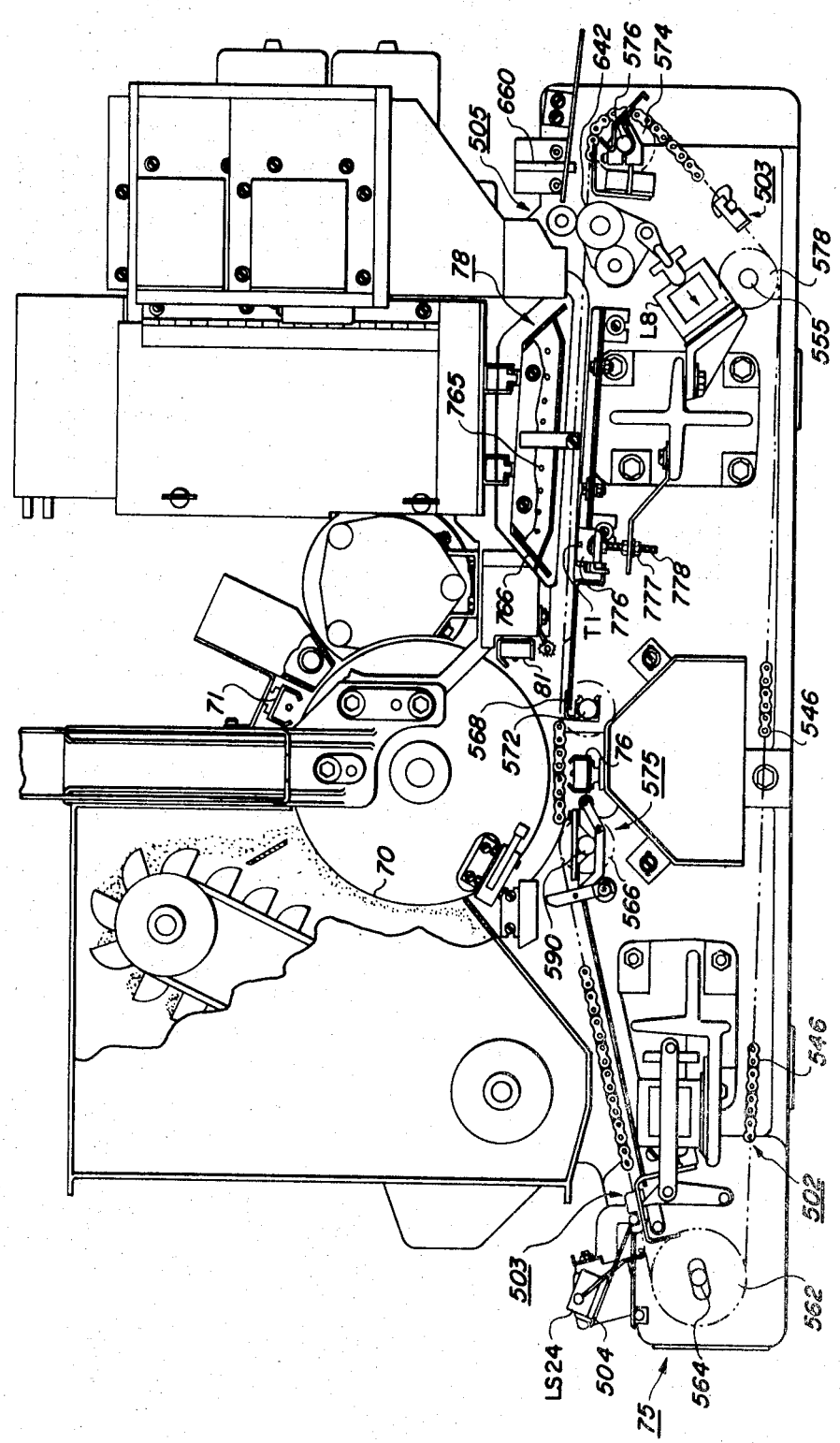
Figure 31:
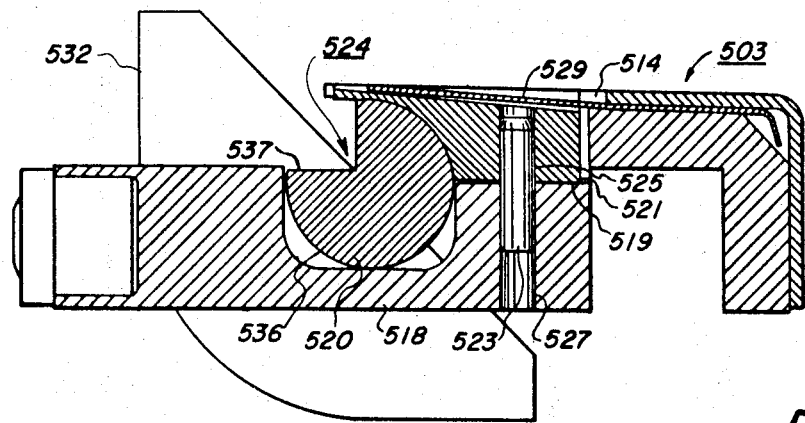
Figure 32:
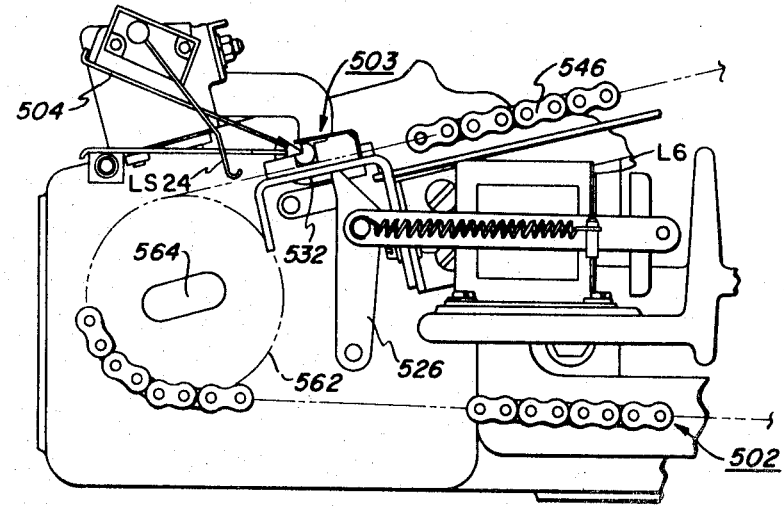
Figure 33:
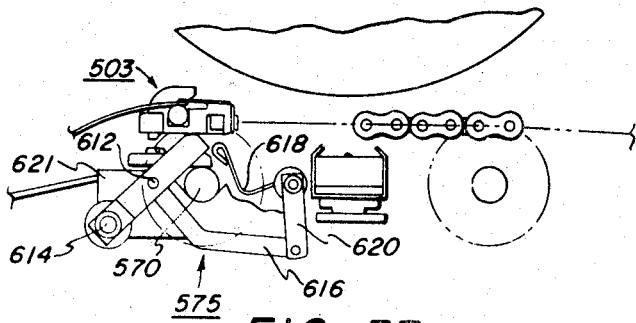
Figure 34:
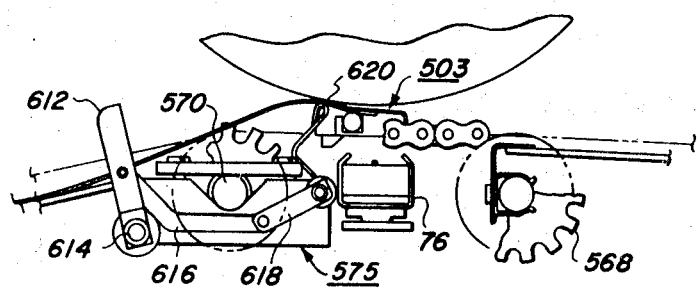
Figure 35:
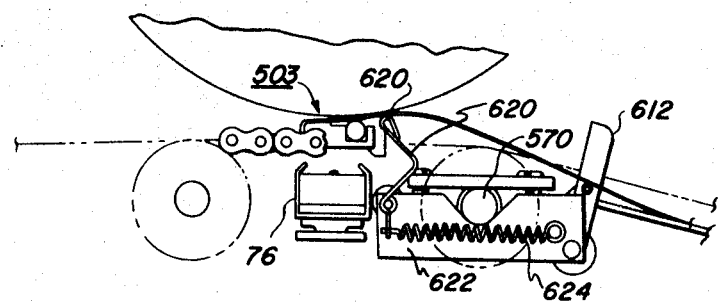
Figure 36:
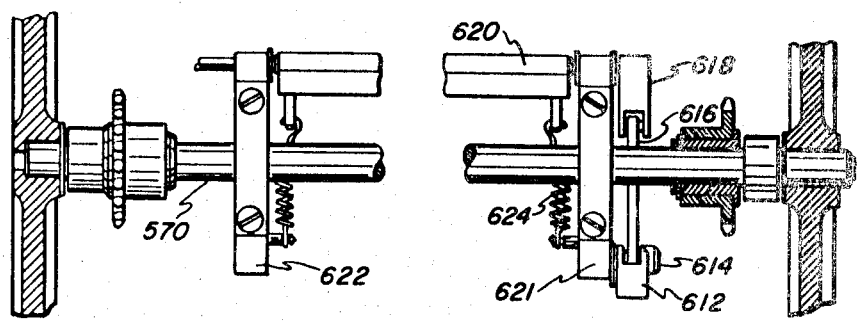
Figure 38:
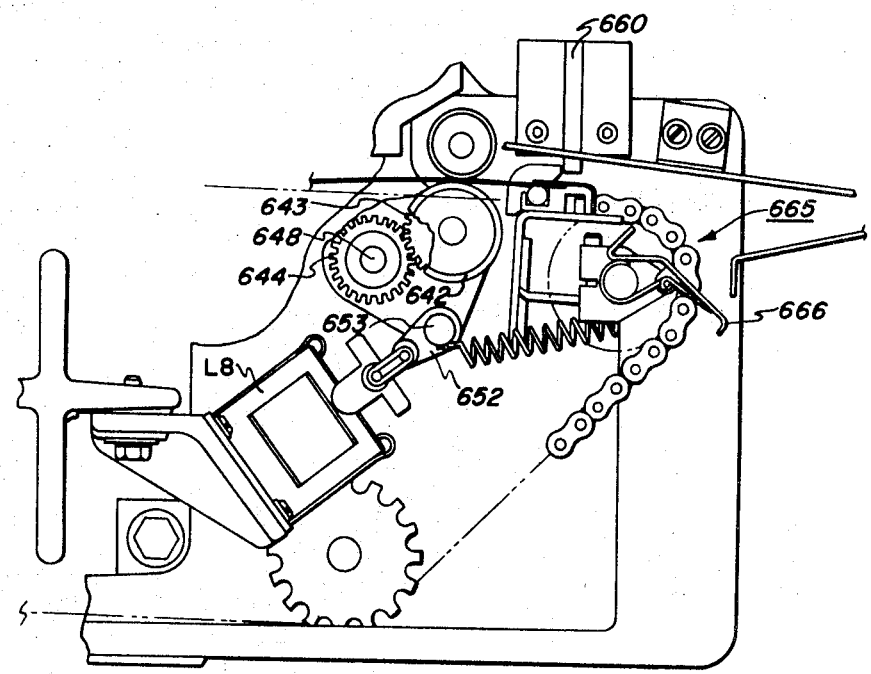
Figure 37:
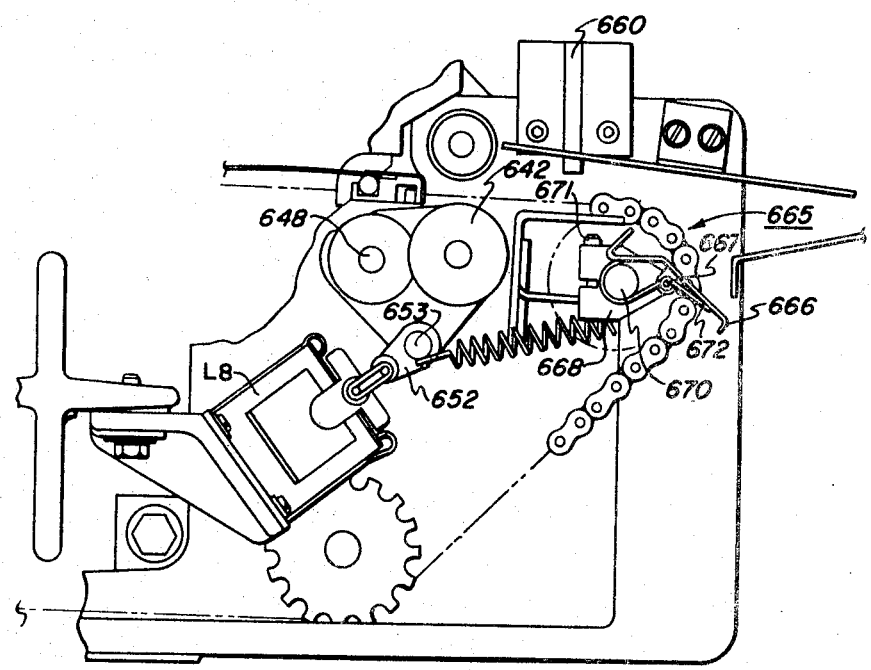
Figure 39:
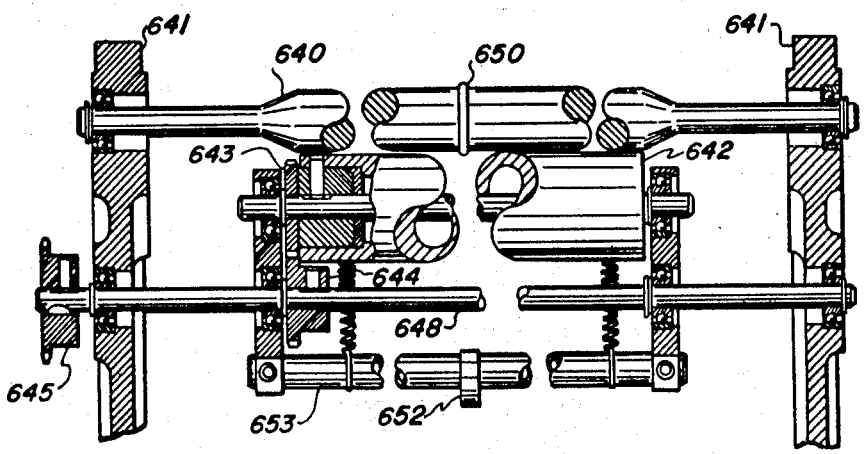
Figure 40:
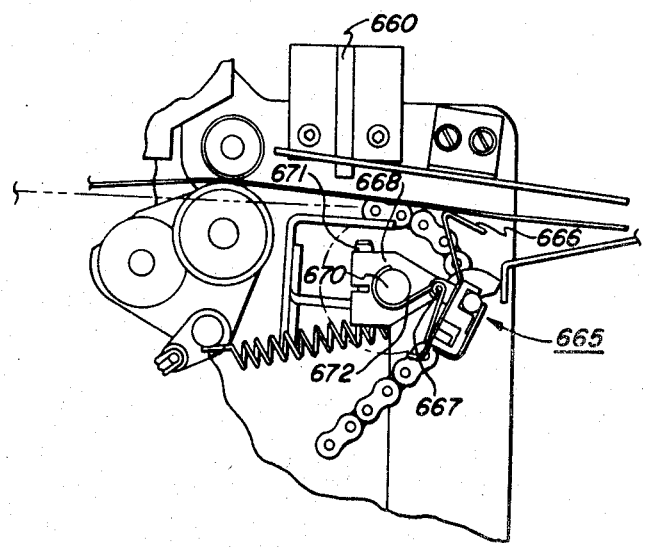
Figure 41:
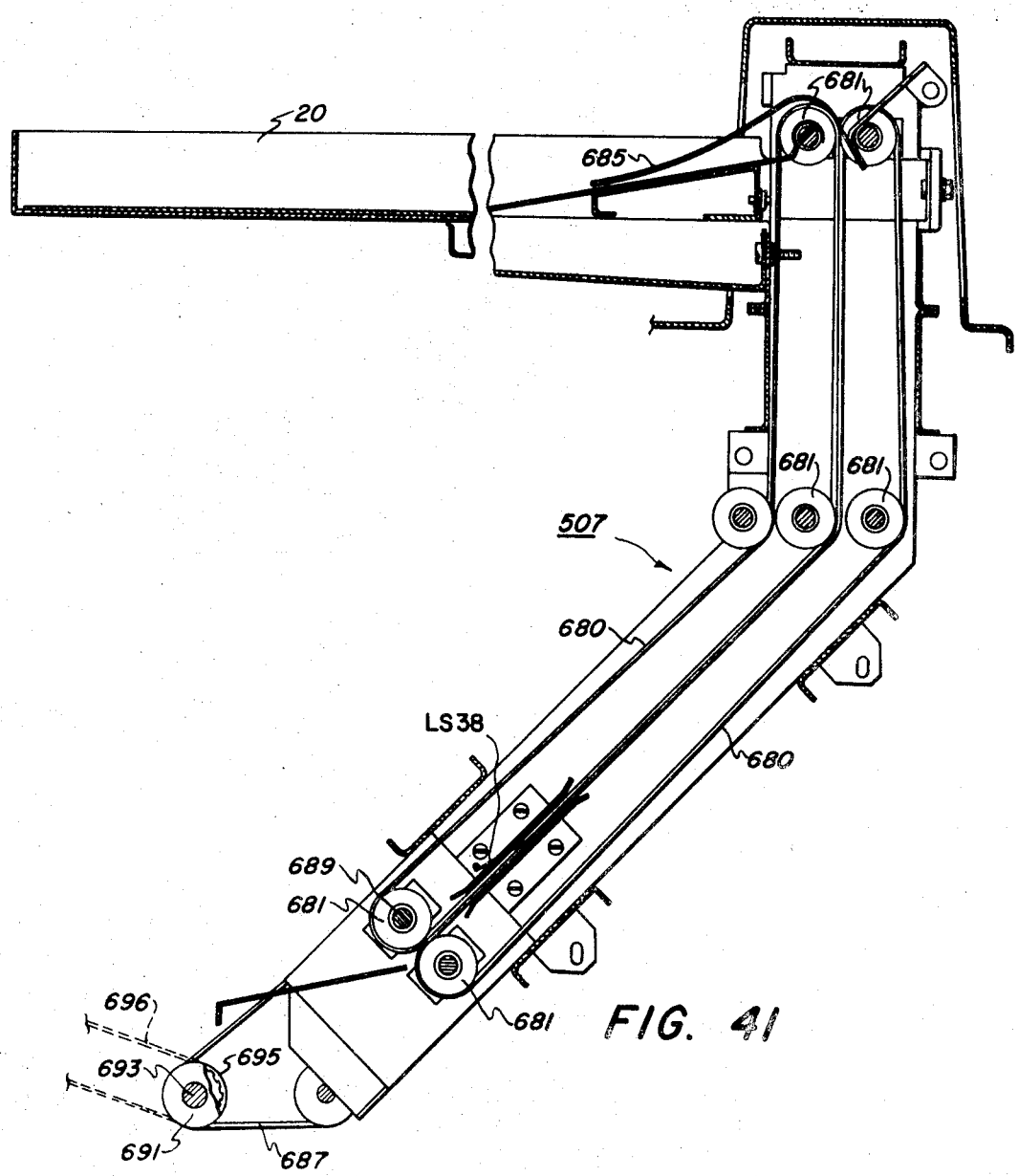
Figure 42:
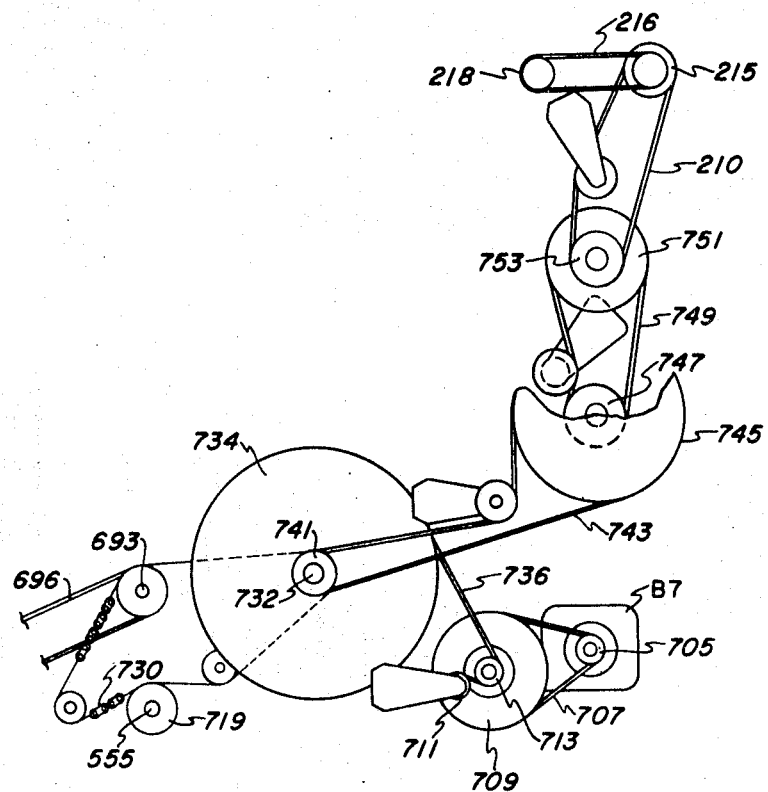
Figure 43:
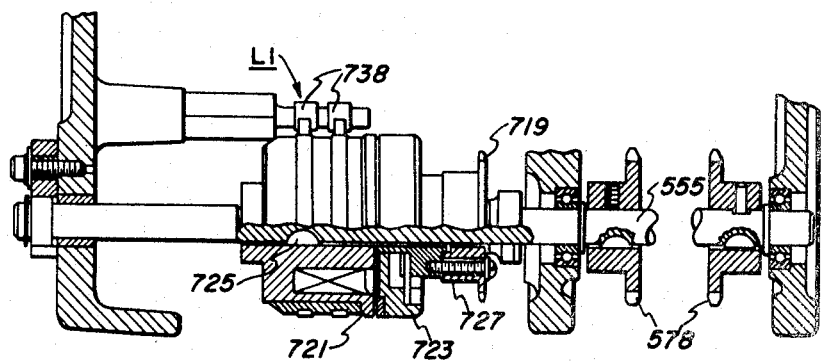
Figure 44:
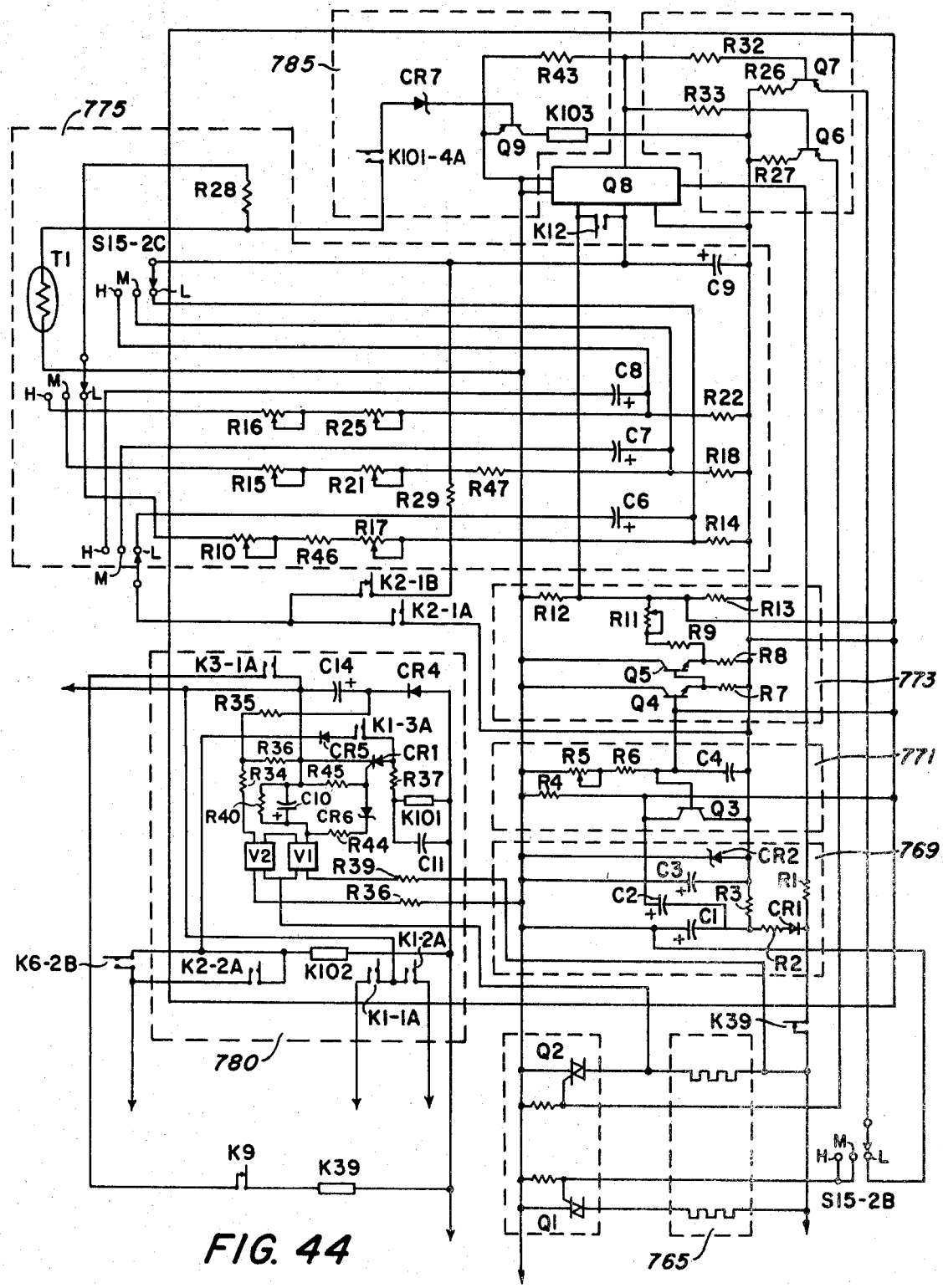
Figure 45:
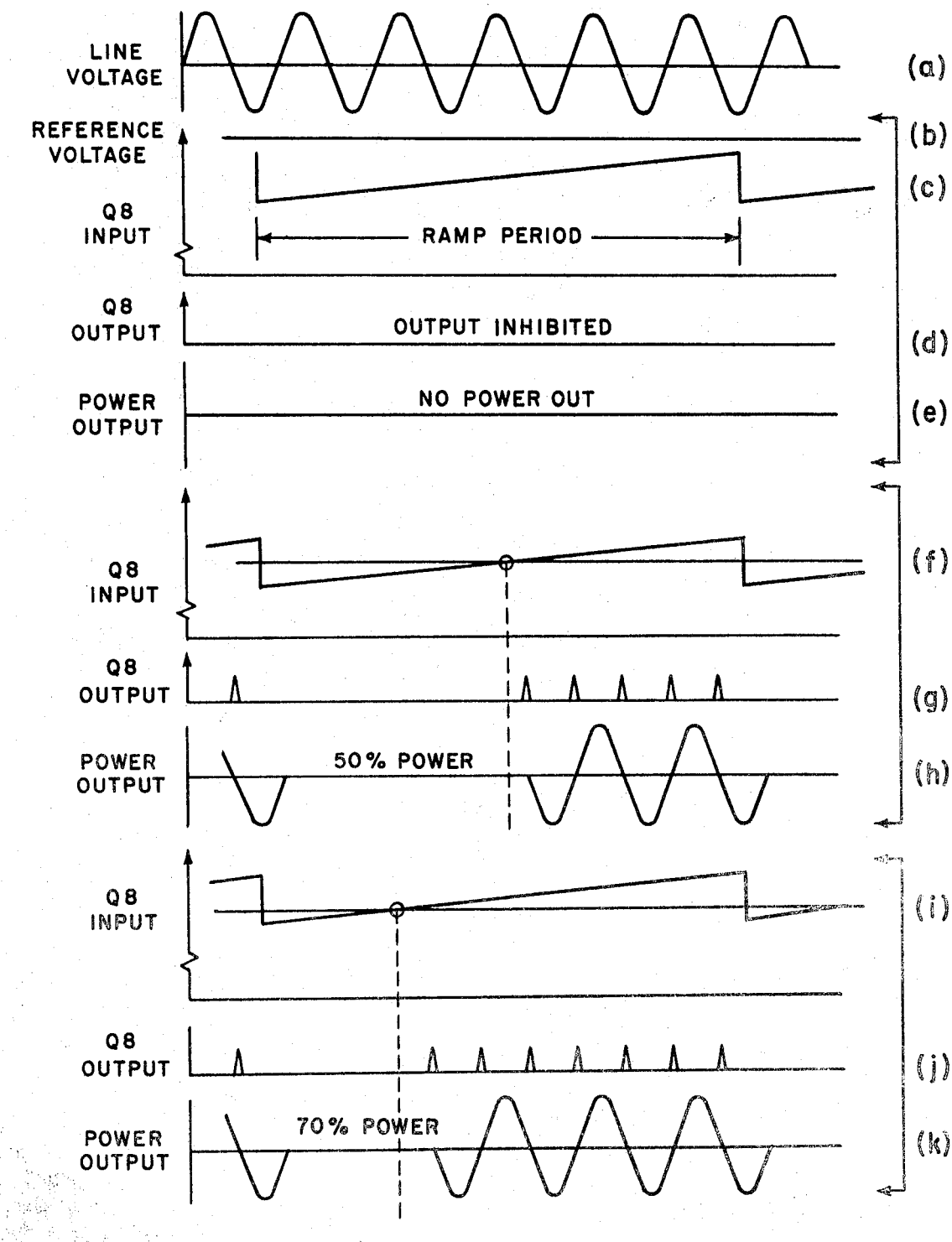
Figure 46:
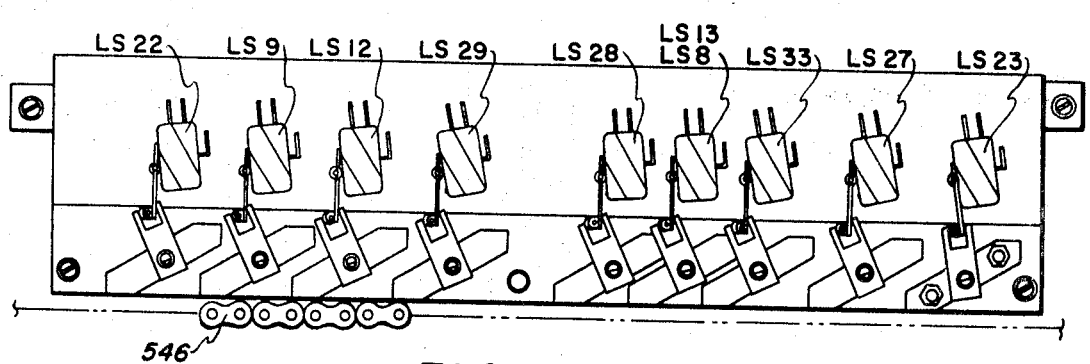
Figure 47:
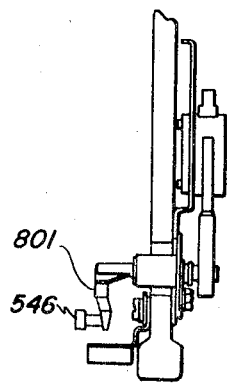
Figure 54:
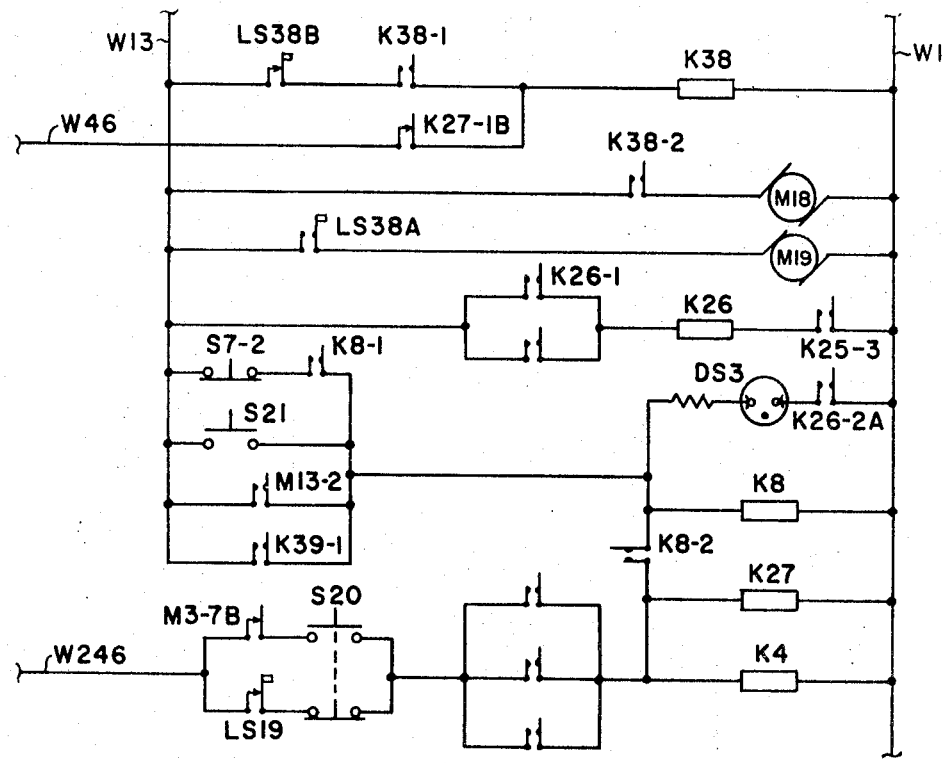
Figure 48:
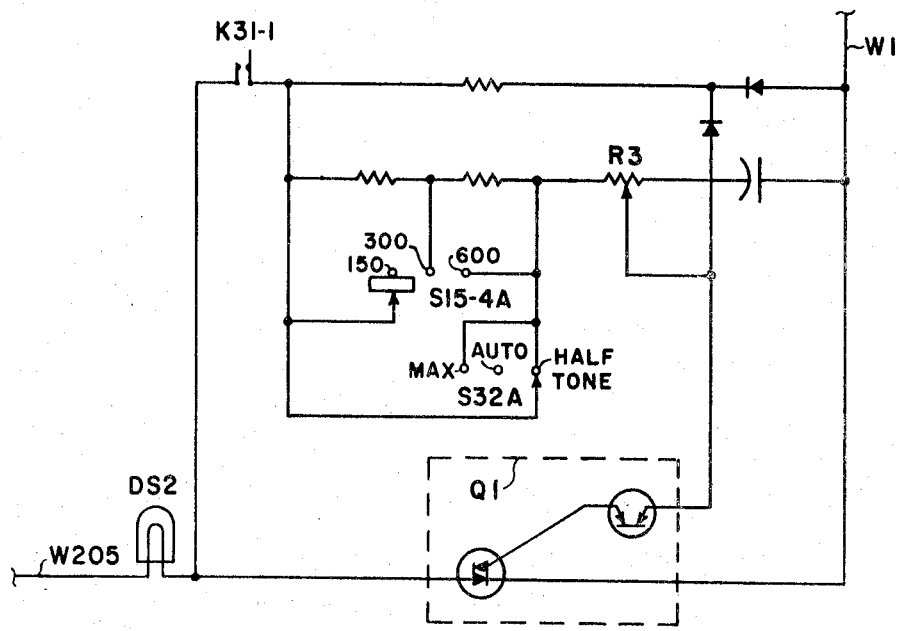
Figure 49:
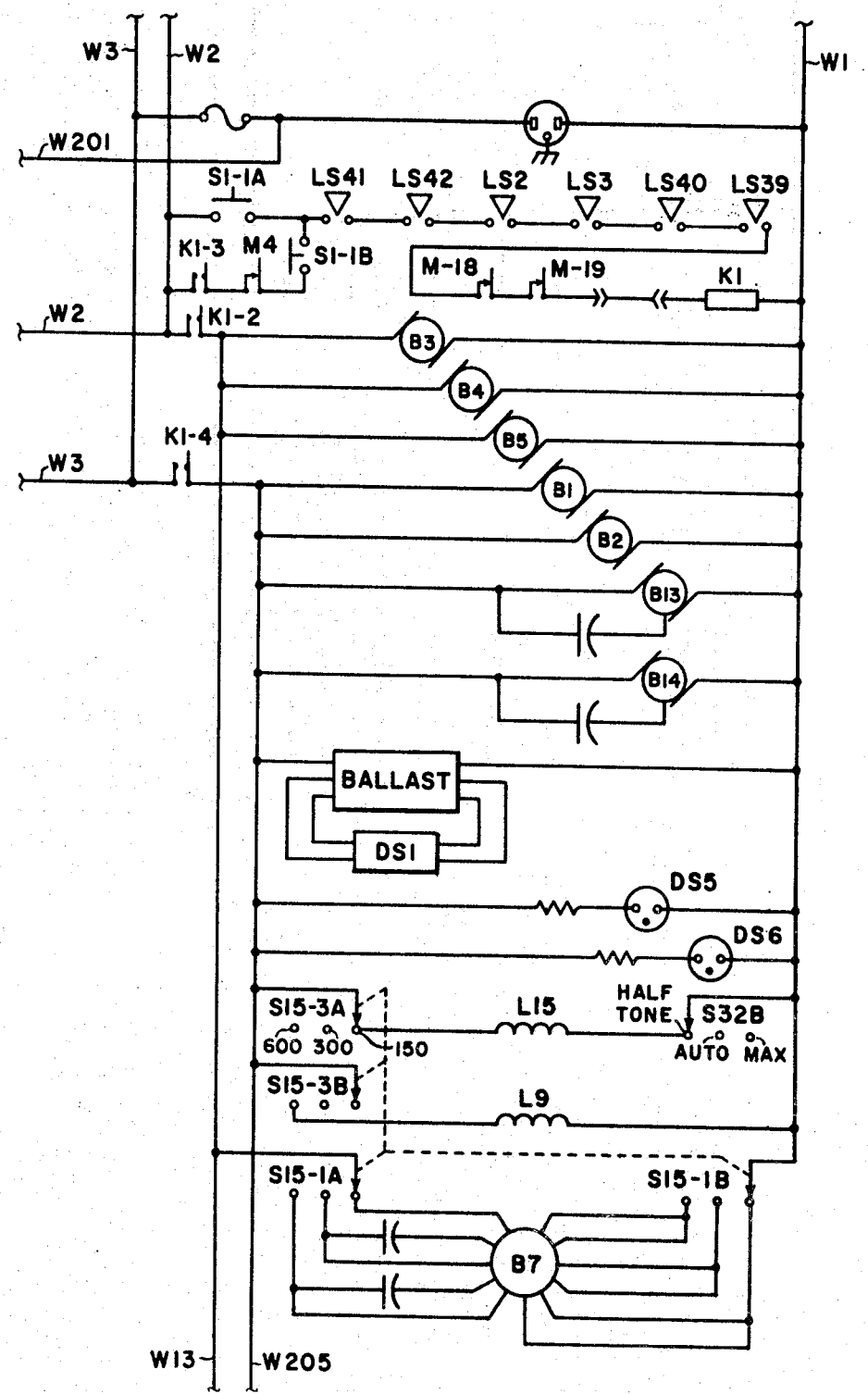
Figure 50:
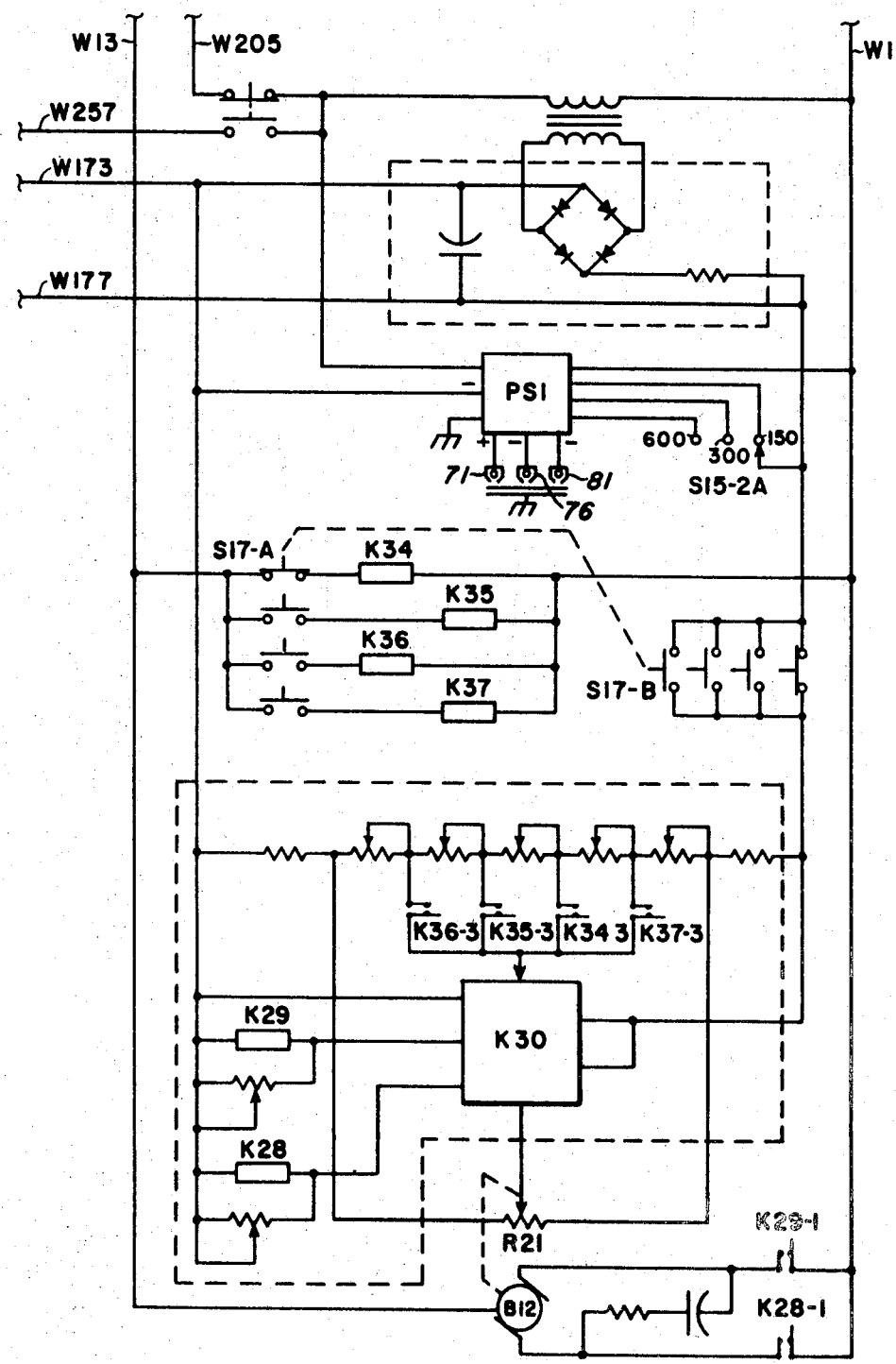
Figure 51:
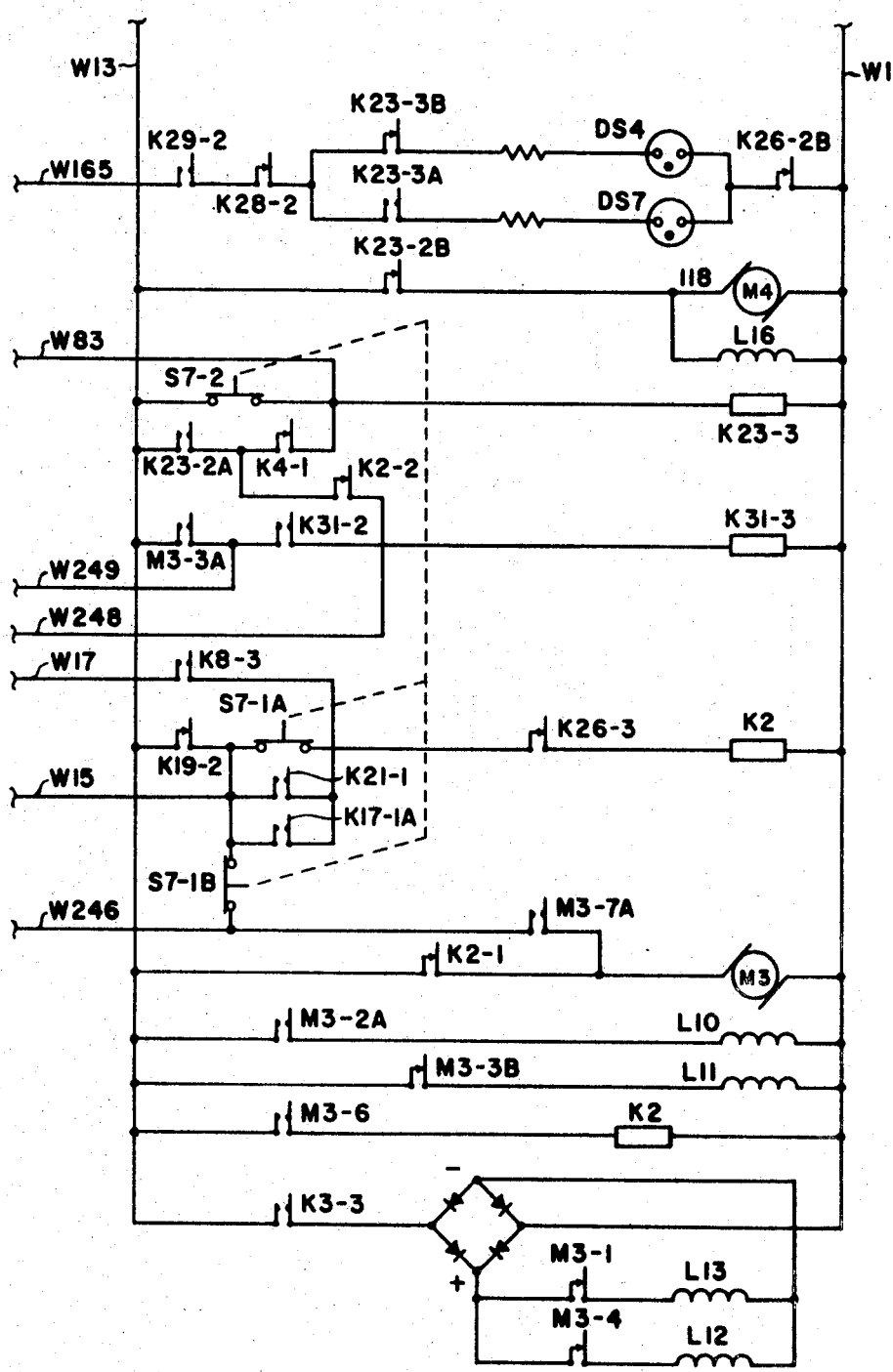
Figure 52:
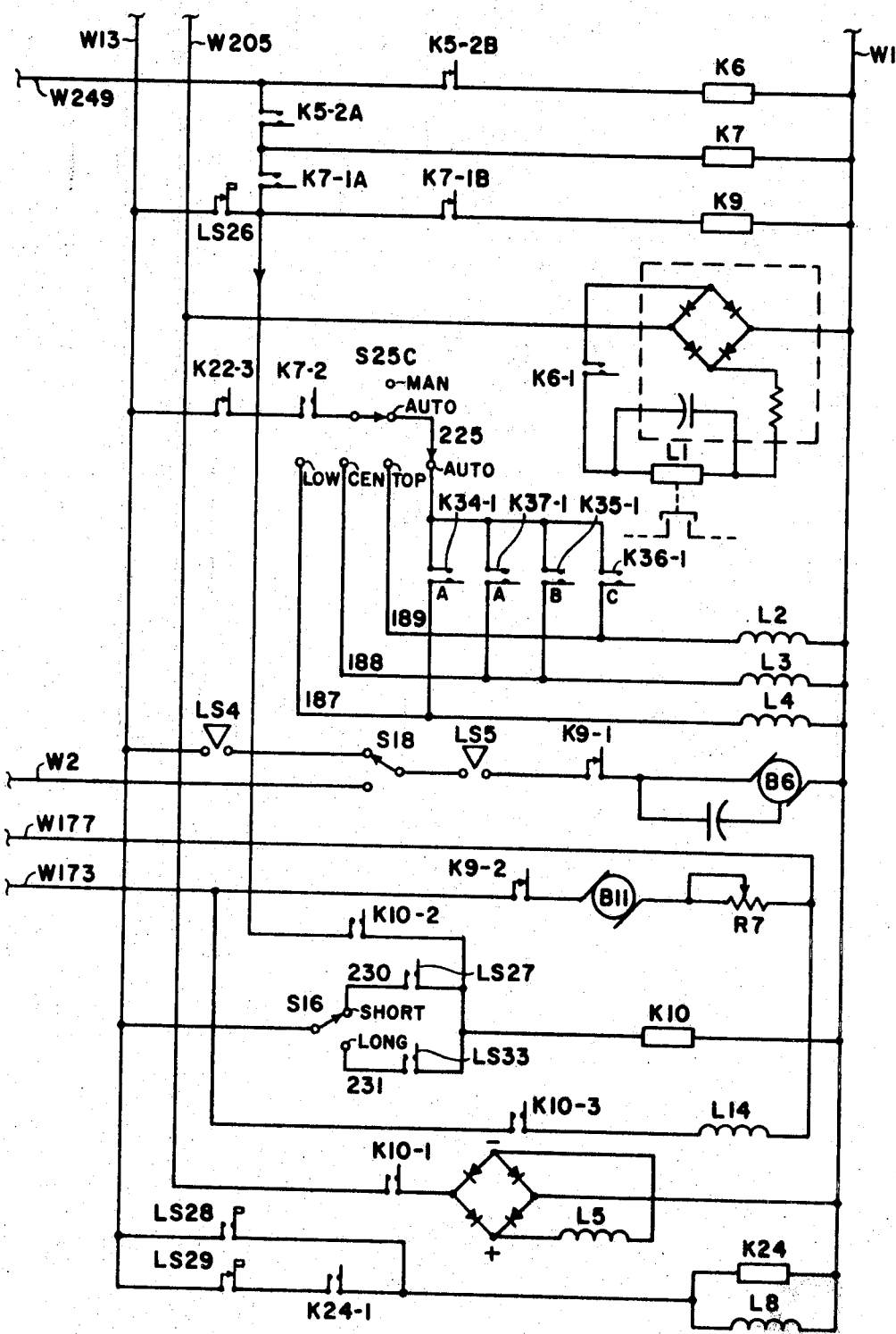
Figure 53:
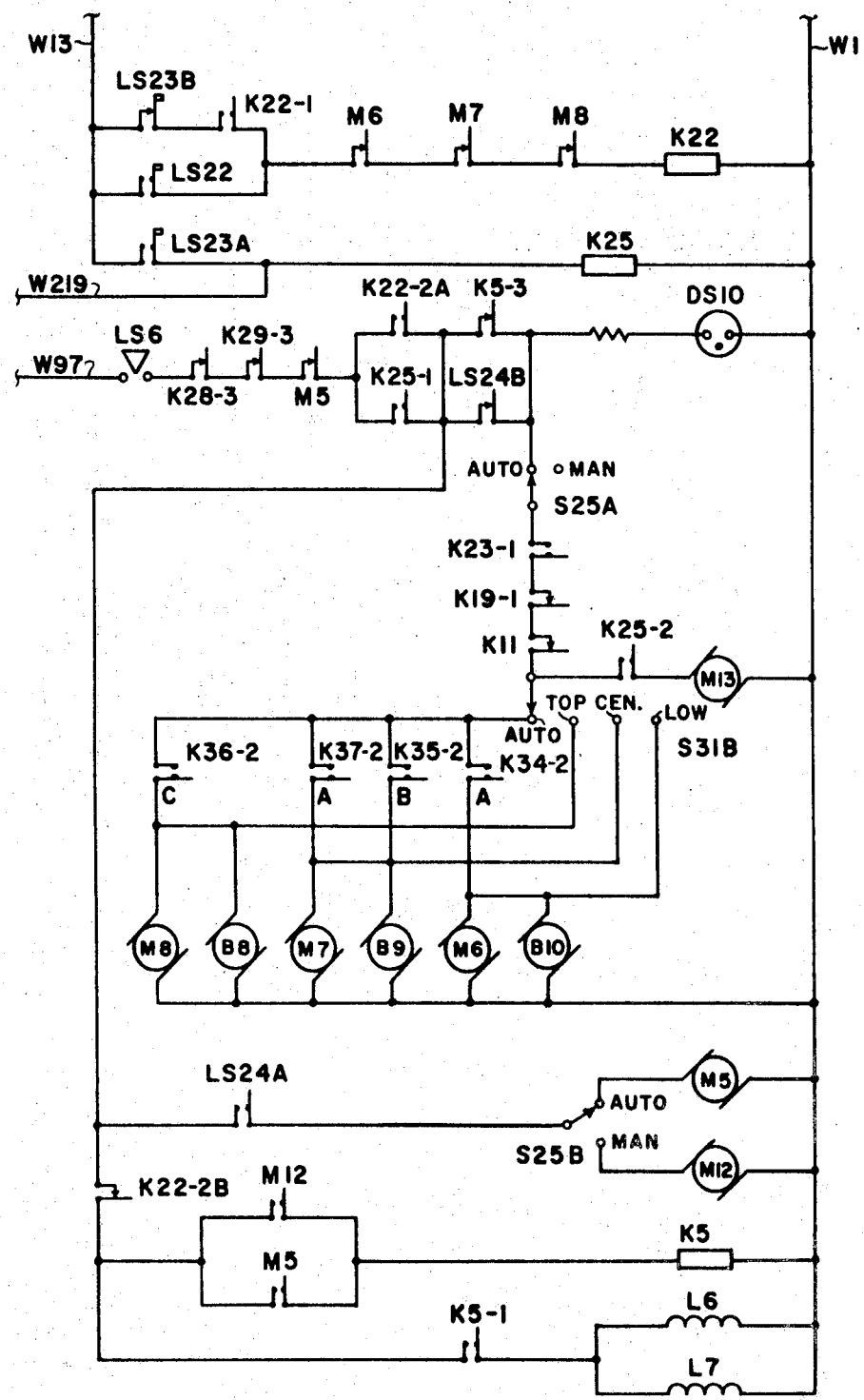

FIG. 20 a is a perspective view of the sheet feed apparatus illustrating manual feed;

FIG. 21 is a top view of one of the sheet feed trays of the sheet feed apparatus with parts broken away to illustrate details thereof;

FIG. 22 is a right-hand perspective view of one of the sheet feed trays;

FIG. 23 is an end view of a sheet feed tray;

FIG. 24 is a side sectional view of the sheet feed apparatus illustrating a clutch mechanism for controlling the operation of the sheet feed apparatus;

FIGS. 25, 26, and 27 are partial views of the clutch mechanism for controlling operation of the sheet feed apparatus;

FIG. 28 is a side sectional view of the sheet transport apparatus of the recording apparatus;

FIGS. 29 and 30 are top and front views of the gripper mechanism of the sheet transport apparatus;

FIG. 31 is an enlarged sectional view of the gripper mechanism taken along line 31–31 of FIG. 29;

FIG. 32 is a side sectional view of the sheet feed-in station of the sheet transport apparatus;

FIG. 33 is a side view of the sheet lift mechanism of the sheet transport apparatus at a position where the leading edge of the sheet is approaching the image transfer station;

FIGS. 34 and 35 are right-hand and left-hand side views of the sheet lift mechanism in a position where the sheet is being flexed to receive an image at the image transfer station;

FIG. 36 is a top view of the sheet lift mechanism;

FIG. 37 is a side sectional view of a portion of the sheet transport apparatus illustrating the leading edge of the sheet approaching the rear sheet feed-out drive mechanism;

FIG. 38 is a side sectional view of a portion of the sheet transport apparatus illustrating the sheet engaged by the rear feed-out drive mechanism;

FIG. 39 is an end view illustrating details of the rear feed-out drive mechanism;

FIG. 40 is a side sectional view of a portion of the sheet transport apparatus illustrating in particular details of the sheet camming mechanism used to guide the sheet leading edge upon release of the sheet from the rear feed out mechanism;

FIG. 41 is a side sectional view of a vertical transport mechanism and associated copy output tray;

FIG. 44 is a schematical electrical wiring diagram of the control circuit for the fuser system;

FIG. 44 is a schematical electrical wiring diagram of the control circuit for the fuser system;

FIG 45 a —k are various waveforms generated by the circuit of FIG. 44;

FIG. 42 is a schematic illustration of the drive system of the recording apparatus;

FIG. 43 is a sectional view of the drive for the sheet transport apparatus illustrating in particular details of a magnetic clutch mechanism;

FIG. 46 shows a side view of the rail switch bank positioned along the path of the sheet transport apparatus for controlling the recording apparatus;

FIG. 47 is an end view of one of the rail switches and cam actuator;

FIGS. 48—54 are schematic electrical wiring diagrams of the recording apparatus and when combined illustrate a wiring system.

GENERAL DESCRIPTION (FIGS. 1—7)

Throughout this description the front of the recording machine is regarded as that portion which the operator faces while placing aperture cards in the machine for reproduction and while operating the various controls. The right and left ends of the machine are regarded as being to the right and left of the operator as he faces the machine. In the particular arrangement shown on the drawings, the invention is incorporated in a fully automatic, continuous copier/duplicator for reproducing microfilm frames mounted in aperture cards. For purposes of illustration the machine reproduces copy on cut sheets of paper in standard sizes of 8½ x 11, 9 x 12, 11 x 17, 12 x 18, 17 x 22 or 18 x 24 which correspond to A, B, and C size engineering drawing sheets. It should be understood, however, that other sheet sizes can also be utilized with the recording machine.

Referring now to FIGS. 1—7 the system generally includes a base section 10 for housing a xerographic drum and processing stations, a sheet feed section 12 for loading copy sheet such as paper, a sheet feed control section 14 (FIG. 5) to select feed mode of operation and sheet size, a card handling and scan section 16 for supplying, feeding and receiving aperture cards to be reproduced, a vertical transport section 18 for delivering the finished copies to a delivery tray 20, a main control section 25 for programming operation and a secondary control section 27 for programming copy quality and copy output speed wherein an operator may select a desired type of system operation.

It should be understood that the machine is arranged to form a lighttight enclosure in the areas of the optical projection system and xerographic processing stations. In addition, the sheet feed section and vertical transport section are modular and can be pulled away from or toward the base section 10 whereby access is permitted to each of these sections and the various xerographic processing stations housed by the base section.

Control section 25 includes an instrument panel for supporting the several operating controls in convenient reach of the operator. These controls include an ON-OFF switch S1, print quantity selector switches S10, S11 to set the quantity of prints desired, print quantity indicators DS5, DS6, to visually show the quantity of prints dialed by selector switches S10, S11, respectively, and print quantity printed indicators DS8, DS9 to visually show the quantity of prints being made. In addition there are status indicator lamps DS4, DS7, and DS3 which read READY, PRINT or AUTO STOP, respectively, depending on system status. Print size bank switches S17 are provided to obtain a corresponding print size A, B, or C. An optical switch is provided in the switch bank, as for example, for A-size prints on B-size sheets, etc. Also on the panel are AUTO and MAN switches S20 to select a mode of aperture card feed operation, and a START PRINT switch S7 and STOP PRINT switch S21.

Secondary control section 27 includes an instrument panel for additional operating controls also in convenient reach of the operator. These controls include system speed control switch S15, illumination control switch R3 and a toner control switch R7. Also provided are various selective output control switches including a lead margin switch S16 and fuser control switches for fine fuser control at the various machine speeds. A pulldown panel 55 provides cover protection for some controls which are not frequently used.

Figure 1:
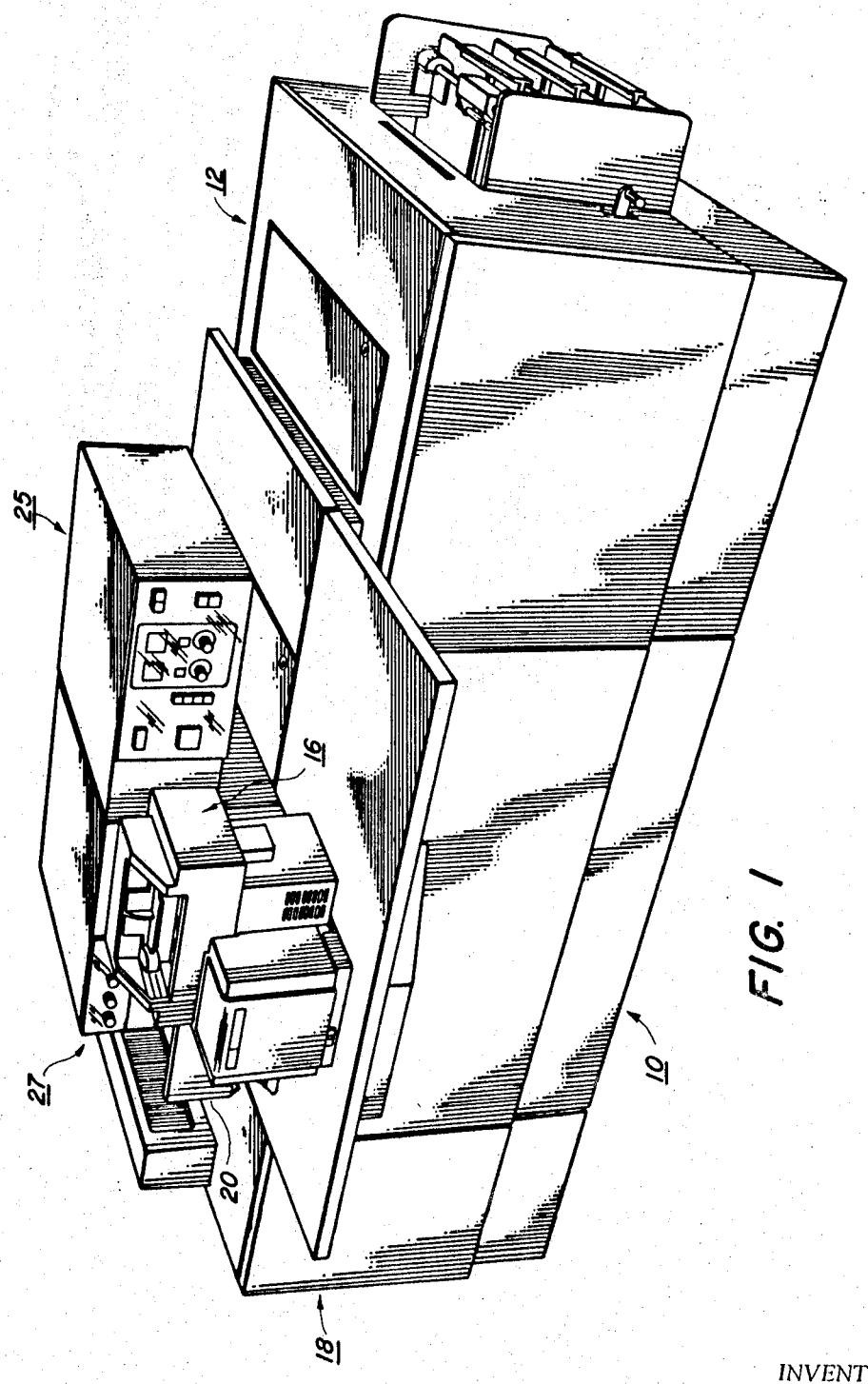
FIG. 1 is a front and right-hand perspective view of the recording apparatus.
Figure 2:
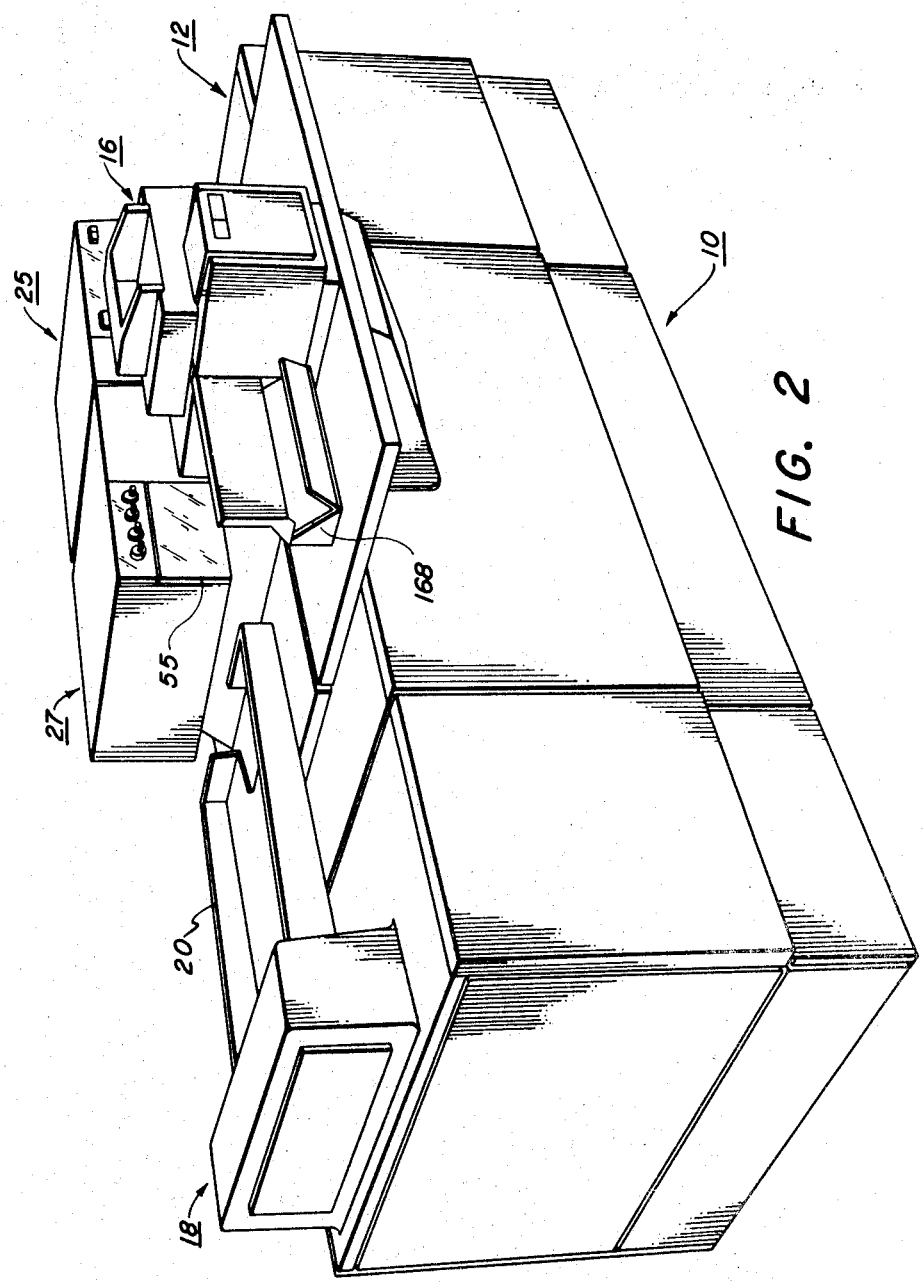
FIG. 2 is a front and left-hand perspective view of the recording apparatus.
Figure 3:
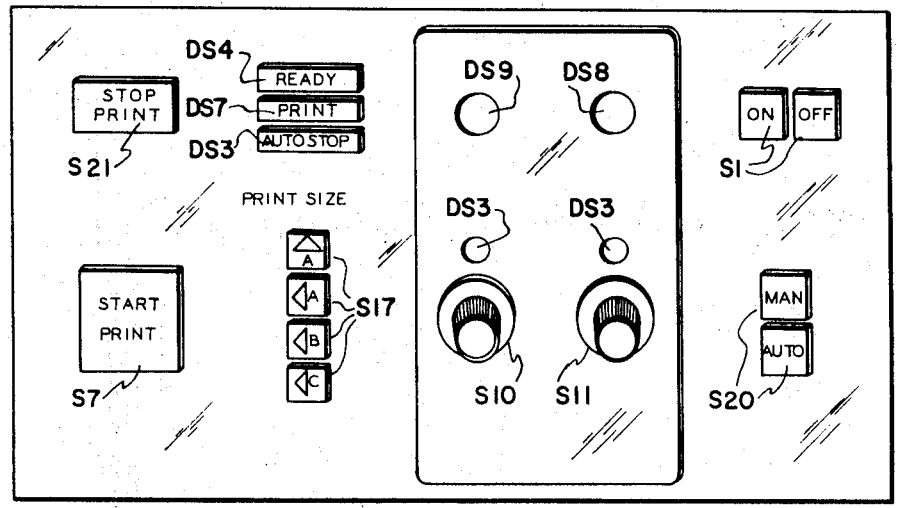
FIG. 3 is a front view of the main control panel of the recording apparatus.
Figure 4:
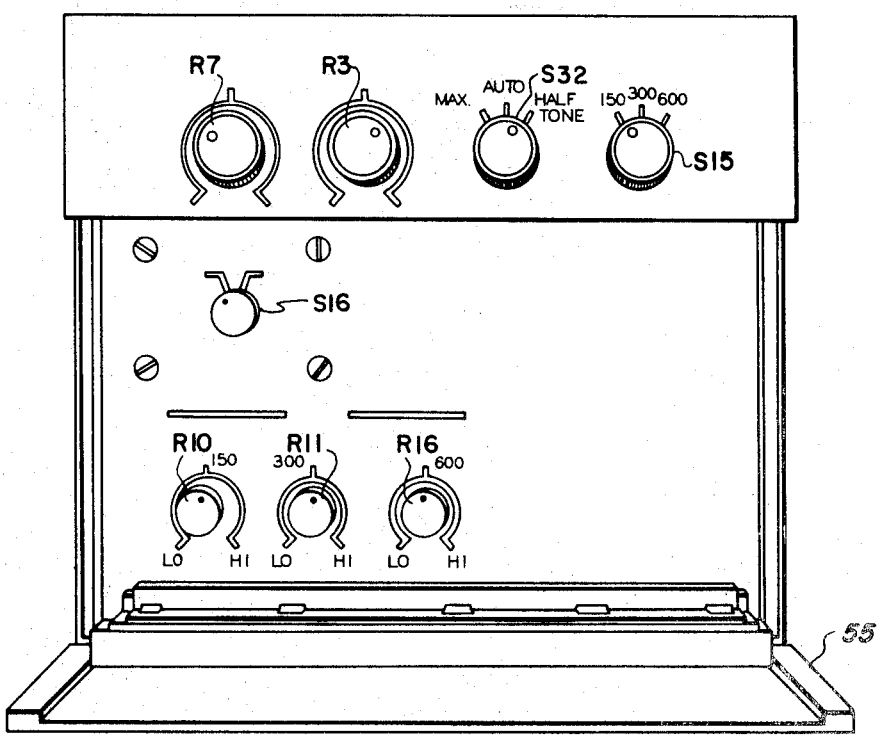
FIG. 4 is a front view of the secondary control panel of the recording apparatus.
Figure 5:
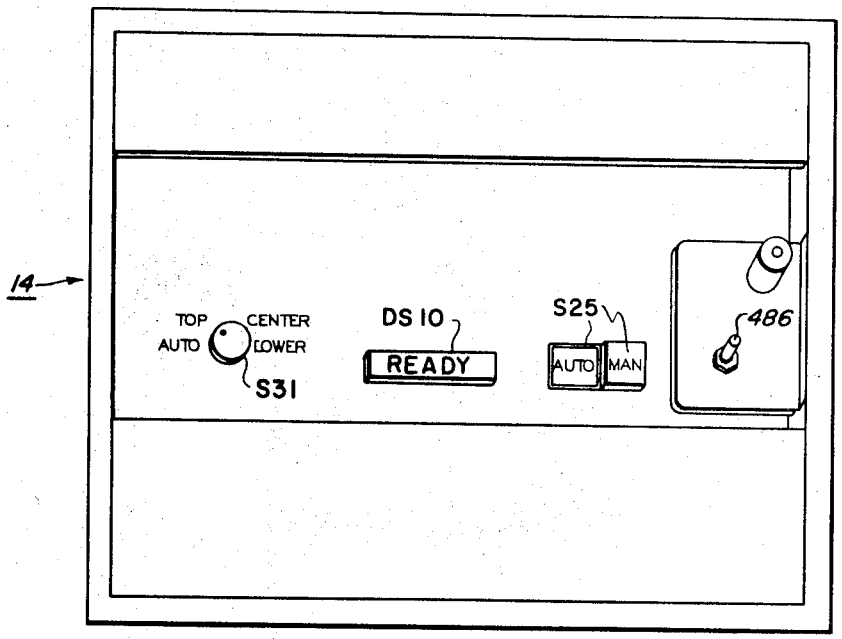
FIG. 5 is a top view of the sheet feed control panel.

FIG. 5 shows the sheet feed control panel which includes a tray selector switch S31, a ready light DS10, and a selector switch S25 to select sheet feed to be automatic or manual.

Figure 7:
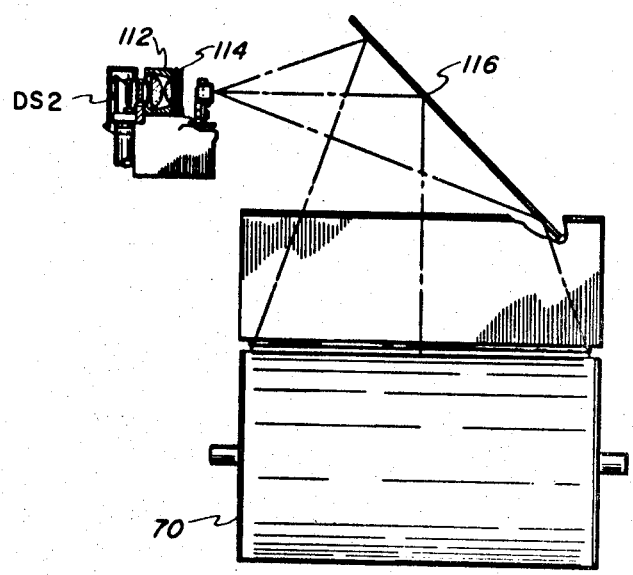
FIG. 7 is a side view of the recording apparatus taken along line 7–7 of FIG. 6.
Figure 6:
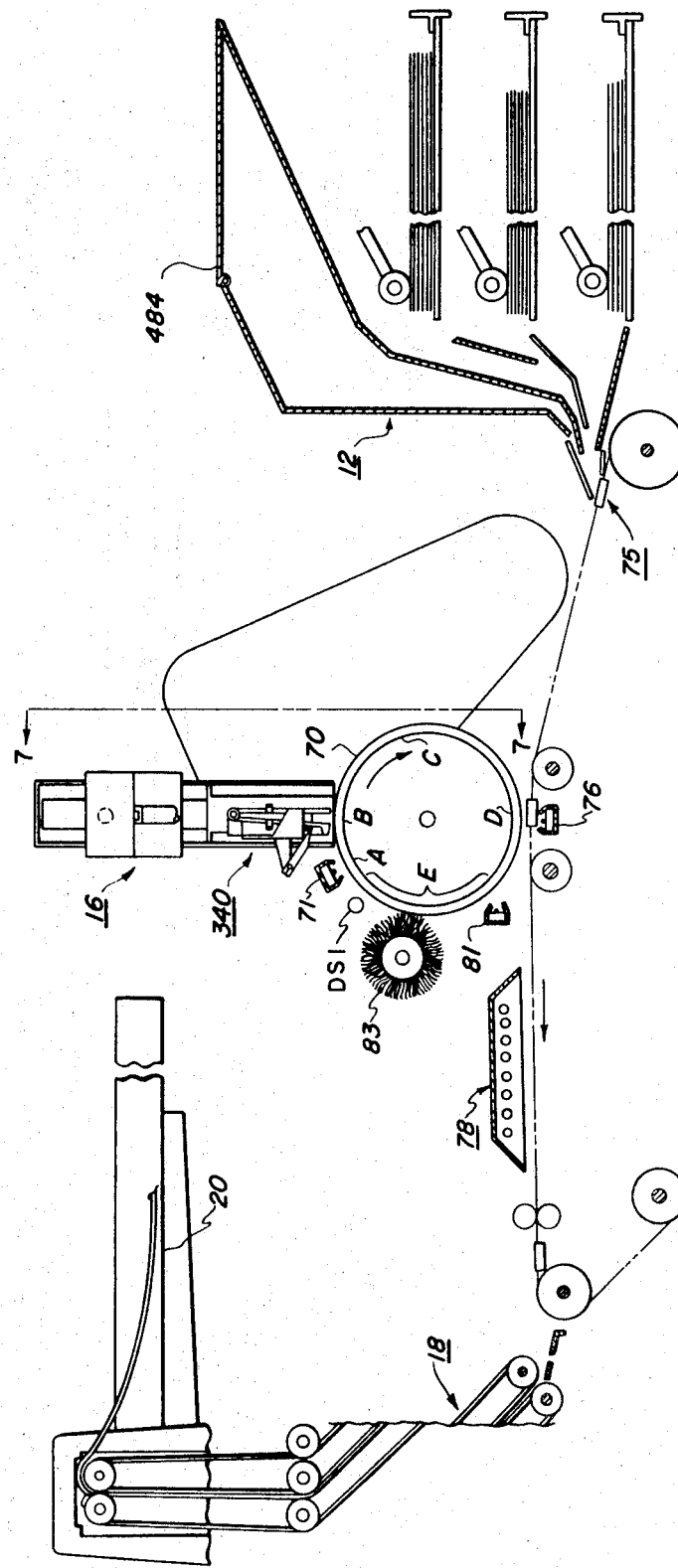
FIG. 6 is a schematic sectional view of the recording apparatus illustrating the various processing stations.
Figure 8:
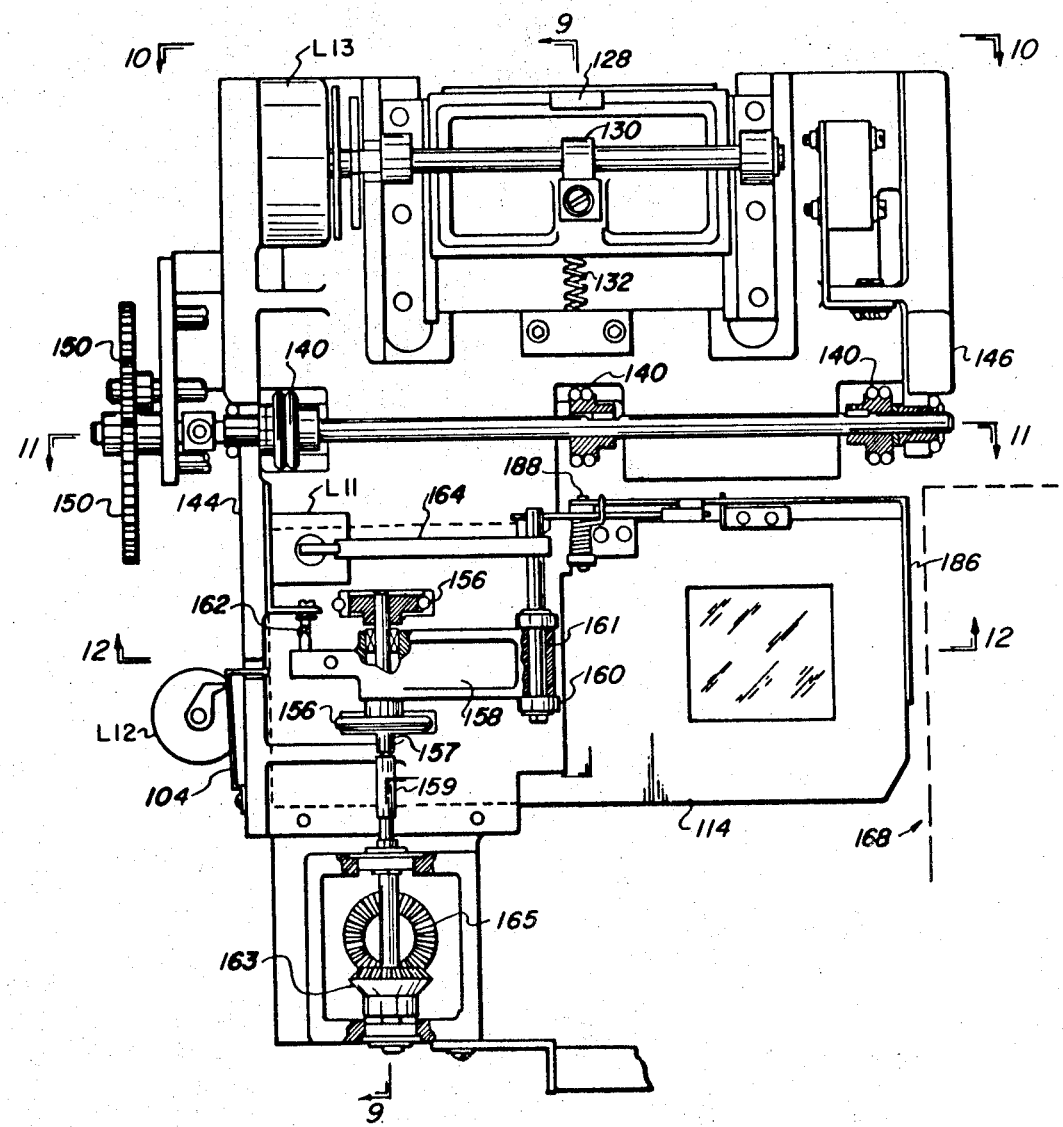
FIG. 8 is a plan view of the automatic card handling and scan apparatus utilized with the recording apparatus.
Figure 9:
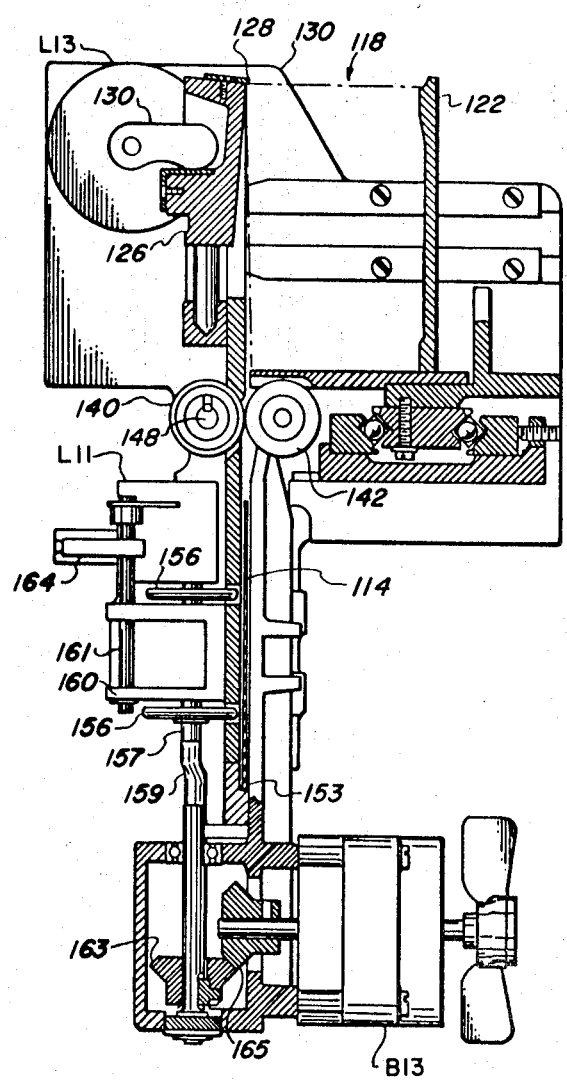
FIG. 9 is a sectional view of the card handling and scan apparatus taken along line 9–9 of FIG. 10 is a top view of the card handling and scan apparatus taken along line 10–10 of FIG. 8.
Figure 10:
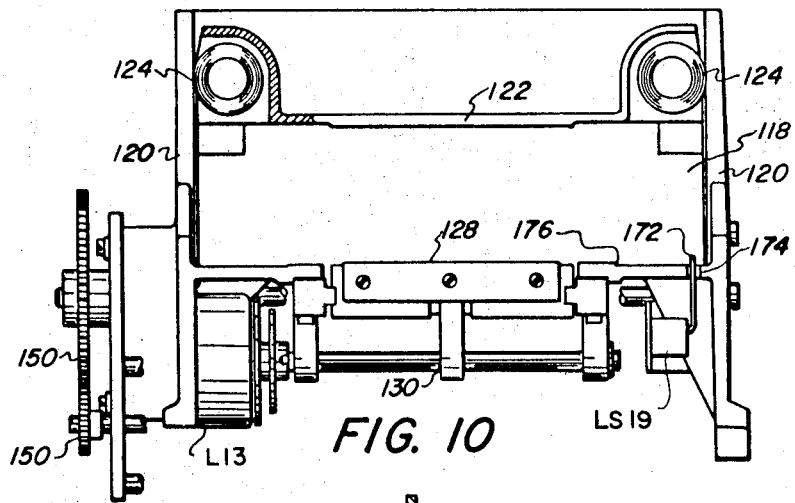
Figure 11:
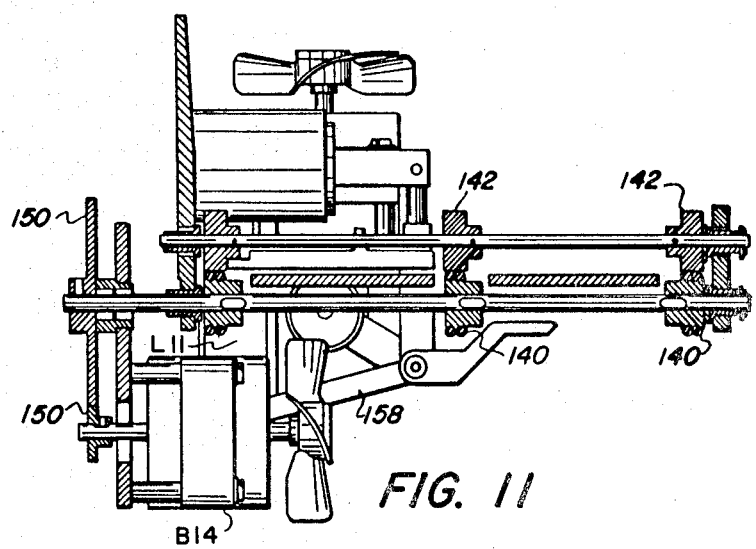
FIG. 11 is a sectional view of the card handling and scan apparatus taken along line 11–11 of FIG. 8.
Figure 12:
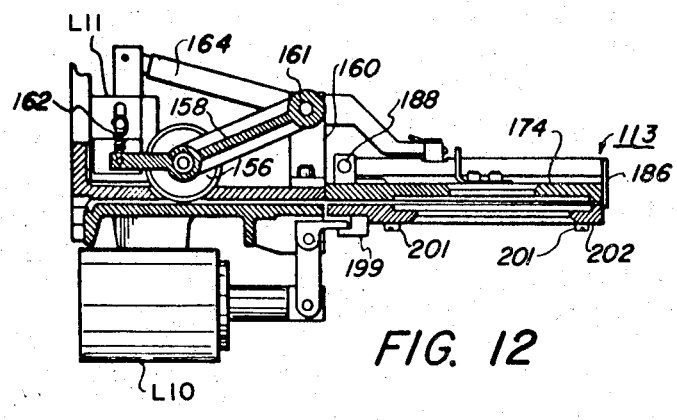
FIG. 12 is a sectional view of the card handling and scan apparatus taken along line 11–11 of FIG. 9.
Figure 13:
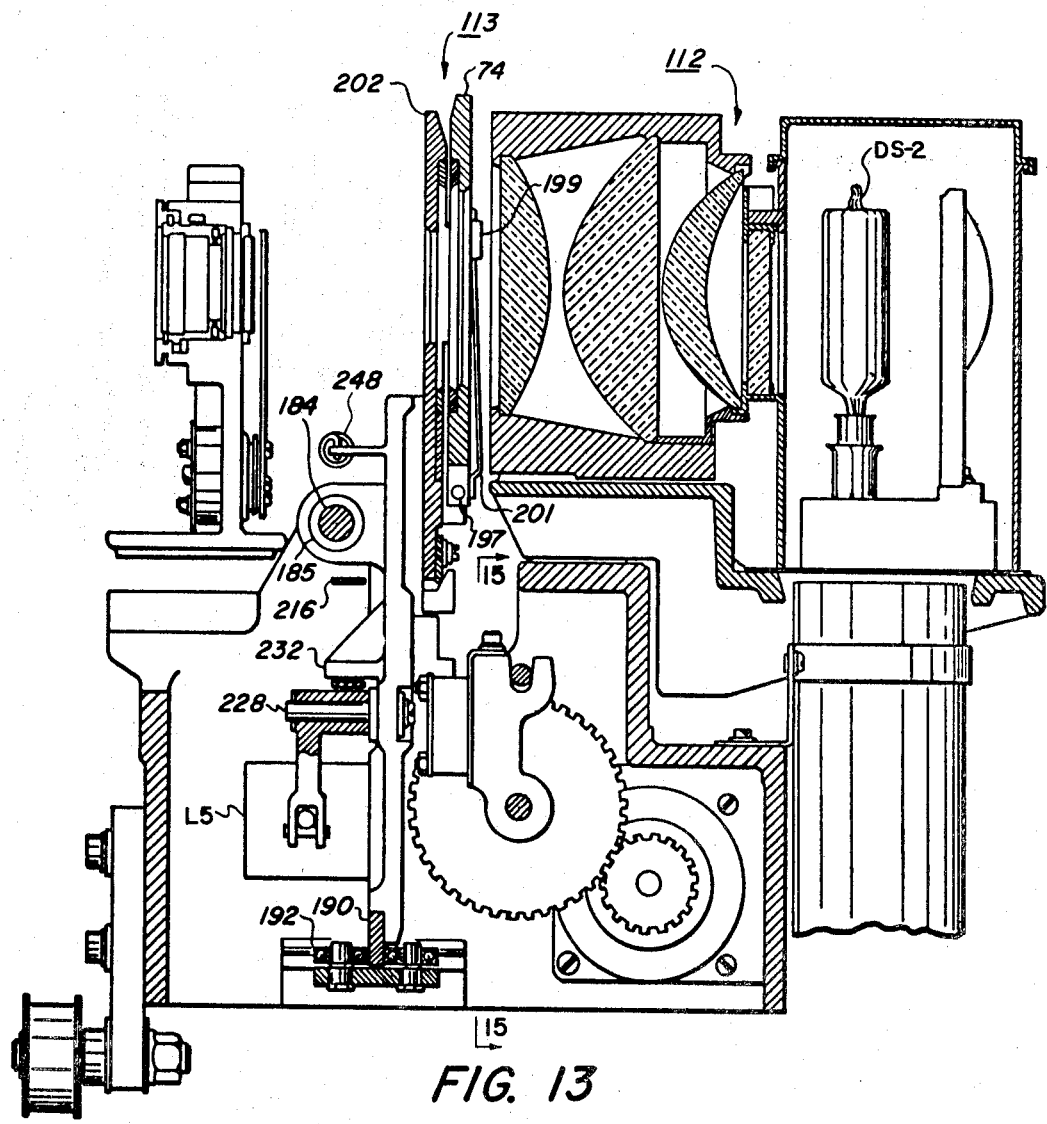
FIG. 13 is a right-hand side view of the projector partly in section with parts removed to show details thereof.
Figure 14:
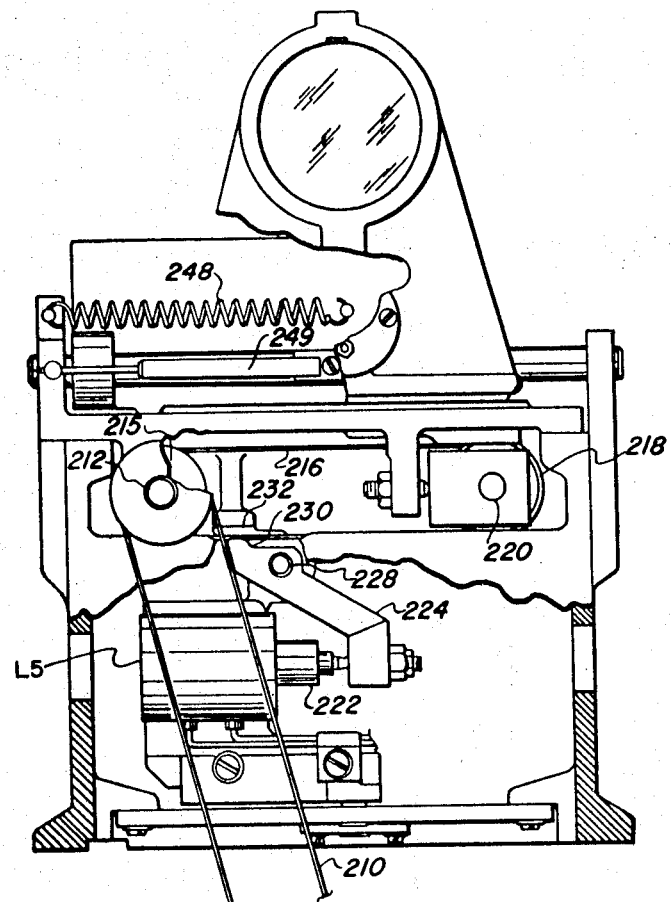
FIG. 14 is a front view of the projector partly in section with parts removed to show details thereof.
Figure 15:
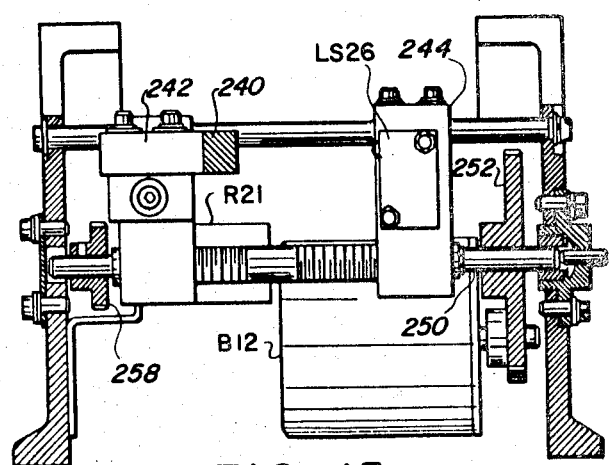
FIG. 15 is a sectional view of the projector taken along line 15–15 of FIG. 13.
Figure 16:
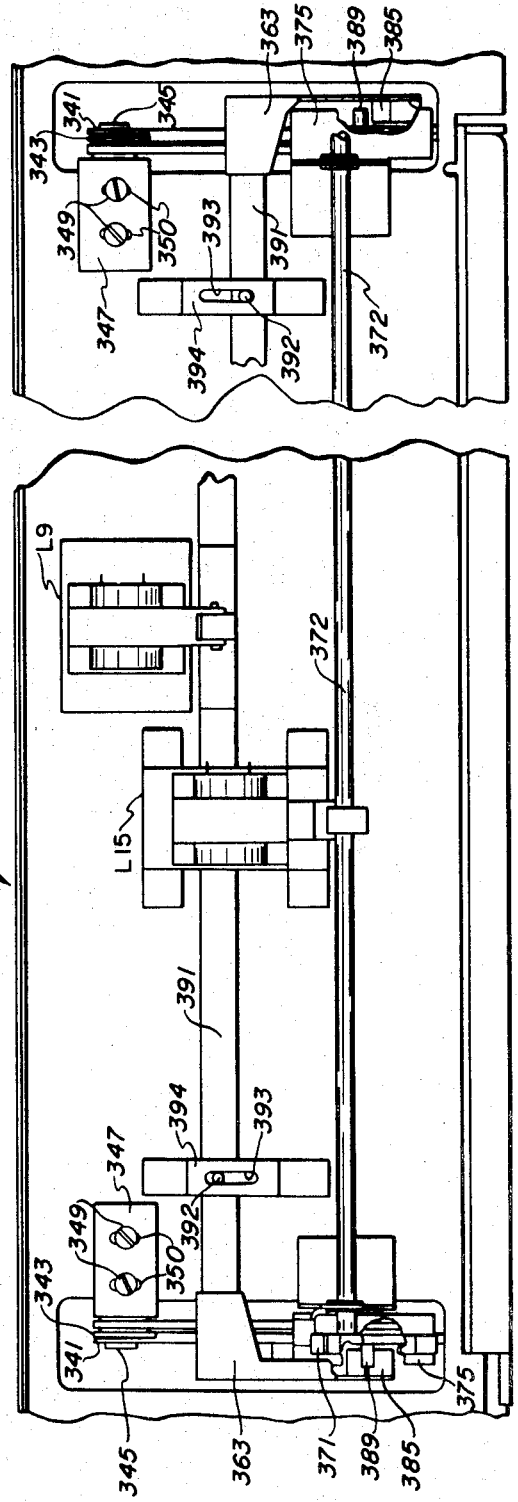
FIG. 16 is a side view of the exposure apparatus of the recording apparatus with parts and sections to illustrate various details therein.
Figure 17:
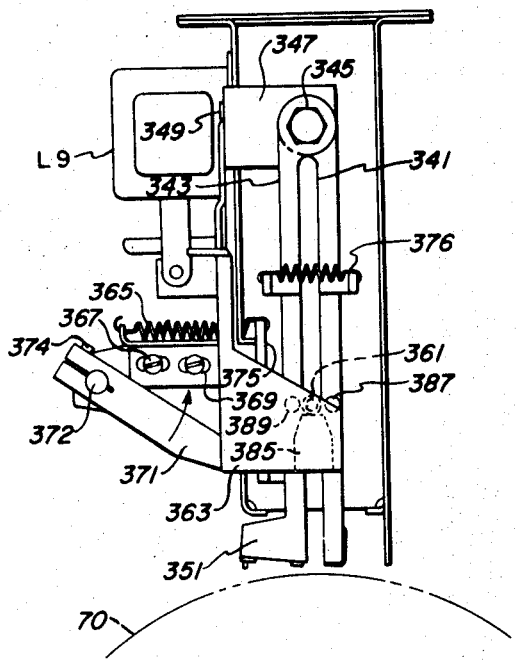
FIG. 17 is an end view of the exposure apparatus illustrating in optical position a slit-defining portion used for producing line images.
Figure 19:
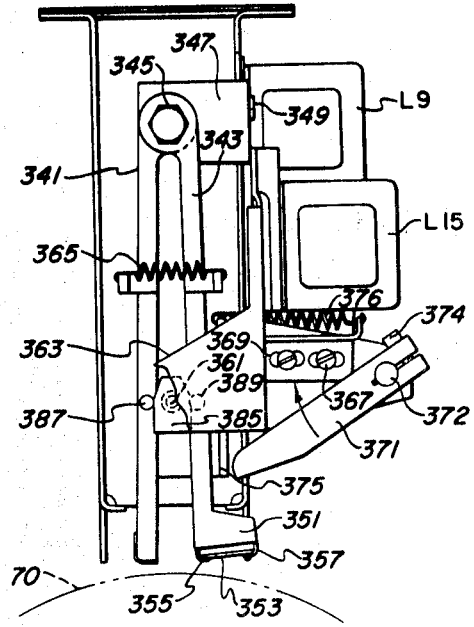
FIG. 19 is another end view similar to that of FIG 17 showing the slit-defining portion in a variable slit width position.
Figure 18:
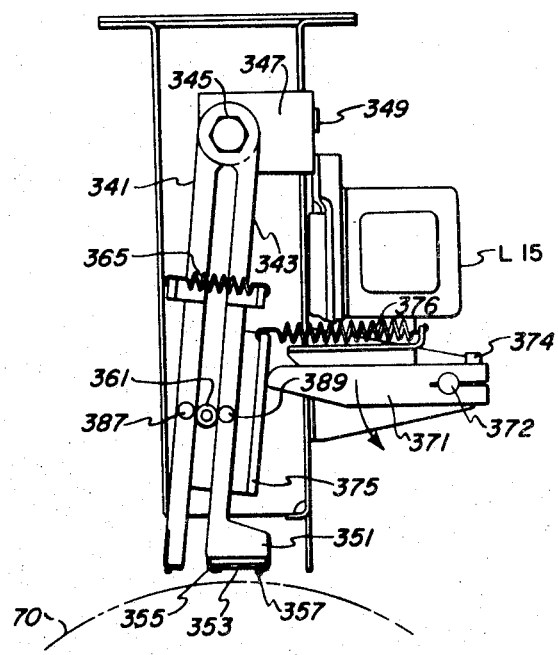
FIG. 18 is an end view as shown in FIG. 17 illustrating in optical position another slit-defining portion of the exposure apparatus used for producing tonal images.

For a general understanding of the xerographic processing stations and system, reference is now made to FIGS. 6 and 7 in which the various system components are schematically illustrated. As in all xerographic systems a light image is projected onto the sensitized surface of a xerographic plate to form an electrostatic latent image thereon. Thereafter the latent image is developed with an oppositely charged developing material to form a powder image corresponding to the latent image on the plate surface. The powder image is then electrostatically transferred to a support surface, such as paper, to which the image is permanently affixed.

In the system of the invention aperture cards are placed in card handling and scan section 16 from which each card is fed in seriatim in a path transverse to the optical path whereby the film frame is scanned in timed relation to the movement of a xerographic plate which is in the form of a drum 70. Xerographic drum 70 comprises a layer of photoconductive material on a conductive backing mounted in suitable bearings in the machine frame. The drum is driven by a multiple-speed drive system past a plurality of processing stations to enable different copy output rates as will be explained more fully hereinafter Drum 70 passes first a charging station A at which a uniform electrostatic charge is deposited on the drum surface by a corona generating device 71.

Next at an exposure station B the drum surface is exposed to a flowing light image of an aperture card film frame to discharge the photoconductive layer in the areas struck by light whereby there remains on the drum surface a latent electrostatic image corresponding to the film frame in the aperture card.

As the drum continues its movement the electrostatic latent image passes through a development station C at which a developing material including granular carrier material and smaller toner particles having an electrostatic charge opposite to that of the electrostatic latent image, are cascaded across the drum surface whereby the toner particles adhere to the latent image to form a powdered image. As toner powder images are formed additional toner particles are supplied to the developing material in proportion to the amount of toner deposited on the drum. For this purpose a suitable toner dispenser is used to accurately meter toner to the developing material.

Positioned adjacent to the development station C is an image transfer station D at which these powder images are electrostatically transferred from the drum surface to sheet transfer material supplied from the sheet feed section 12. A sheet transport apparatus generally designated 75 serves to transport the sheet material received from sheet feed section 12 toward a transfer station D where a corona transfer device 76 similar to the corona charging device 71 and of a polarity opposite to the toner particles is located to effect electrostatic transfer of the developed image onto the sheet material. After transfer, the powder image is permanently affixed to the sheet material by fuser apparatus 78 and the sheet material conveyed onto vertical transport section 18 for delivery to tray 20.

A drum cleaning station E comprises a preclean corona discharge device 81 of a polarity opposite to the toner particles and a brush 83 to effect removal of residual toner particles remaining on the drum surface after image transfer. A light source DS1 completes discharge of any residual electrostatic charge remaining thereon whereby the drum is ready for another cycle through the processing stations just described. For a more detailed explanation of the processing stations reference is made to U.S. Pat. No. 3,062,109 to Mayo et al.

CARD HANDLING AND SCAN APPARATUS (FIGS. 8—15)

The card handling and scan apparatus is capable of feeding an aperture card, then scanning the card, and then delivering the card to another place all automatically and during continuous operation of the machine.

The card handling and scan apparatus comprises a projector 112 having a movable carriage 113 for transporting an aperture card 114 in light projecting relation to the moving surface of recording drum 70. Uniform lighting of a film frame on an aperture card 114 transported on the carriage is provided by a projection lamp DS2. To enable projector 112 to be mounted on the front and in the center for operator convenience, an optical system is provided which includes an image mirror 116, mounted in a light shield frame. By this structure an aperture card is arranged for movement in a path to traverse the optical path in reverse direction whereby the film frame is scanned in timed relation to the movement of the recording surface to project a light image corresponding to the film frame onto the surface of the drum. After projection of the light images, one or more times, the card is ejected from the carriage and is deposited into a receiving tray as will be more fully understood hereinafter.

Aperture cards to be fed are stored in a magazine 118 that includes vertical guide members 120 for holding a stack of cards in alignment. Magazine 118 is arranged to permit the feeding of cards from the front of the card stack. A backing plate 122 urged by a pair of negator springs 124 urges the cards against a movable feed block 126.

For moving each card out of magazine 118, movable feed block 126 is provided with an adjustable pickerknife 128 that is arranged to engage leading edge of the first card of the stack. Feed block 126 is mounted for sliding movement toward and away from the exit slot of the magazine, and is actuated by an arm 130 of a rotary solenoid in timed relation to the operation of the remainder of the card handling apparatus. Feed block 130 is returned by a spring 132 mounted at the bast thereof.

As each card leave magazine 118, it is gripped by a set of feed rolls 140 and 142 and advanced downwardly to carriage 113. For this purpose, feed rolls 140 and 142 are journaled for rotation in side plates 144 and 146. Rolls 140 are driven clockwise and are urged into engagement with rolls 142. For driving feed rolls 140, a shaft 148 extends through a bracket 144 and is connected to suitable driving gears 150 that rotate continuously while the apparatus is in operation. Gears 150 and therefore rolls 140 are driven by a motor when energized. A card is advanced to the carriage 113 which at this point of operation is directly aligned with the feed rolls to receive the card. As the card is conveyed from the feed rolls 140 and 142, it is registered against a stop 153.

Immediately thereafter, carriage 113 is moved to the right in a path of movement normal to the card feeding movement to effect the image scanning operation. After the film frame of the card is scanned, carriage 113 is returned to its original position where the card is ejected from the carriage by eject rolls 156 that are rotatably mounted on shaft 157 on a pivot are 158, pivoted in a plate 160 by a shaft 161 and resiliently urged out of contact with the card by a spring 162. Shaft 157 is continuously rotated by a flexible drive shaft 159 through gears 163 and 165 powered by a motor B13. A solenoid L11 when energized actuates an arm 164 which is rigidly secured to shaft 161 and thereby actuates the eject rolls 156. The continued driving action of eject rolls 156 is effective to eject the card which comes to rest in a receiving tray 168.

When the supply of cards in magazine 118 is exhausted, a "last card" limit switch LS19 mounted on a side plate 170 serves to stop the machine. This switch functions to keep the operating circuits energized as long as the switch is actuated or during the period in which cards remain for feeding to carriage 113. For this purpose a switch-actuating element 172 extends through an opening formed in plate 170. Engagement of each card with actuating element 172 serves to maintain the circuits energized. When the last card is fed, switch LS19 is deenergized and the circuits opened to enable the machine to come to the standby mode and after a specified length of time shut down.

In the normal operation of the card handling and scan apparatus, carriage 113 is positioned at the start of its scan stroke of movement, in which it is in register with the card magazine 118. When the operation is started, carriage 113 is in a position in register with feed rolls 140 and 142 of the card magazine to receive the next card for reproduction. The carriage is held in this position to permit the ejection of a card after the desired number of copies are produced and to receive a new card and to effect the several mechanical movements and circuit connections of the card handling operation as will be explained hereinafter. Card carriage 113 includes a casting having a flat platen 174 for supporting cards and a vertically disposed gate 176. The carriage is adapted for lateral movement on a shaft 184 which extends within bushings 185. A lower portion 190 of carriage 113 is guided by a pair of stabilized bearings 192 and 194 secured to the base. By this structure, carriage 113 is supported for movement on shaft 184 while maintaining its card supporting surface in a vertical position throughout its path of movement.

For guiding microfilm cards onto the platen 174 a U-shaped register arm 186 is pivotally mounted on a pin 188. The register arm 186 is arranged with an offset lever 187 that is pivotally mounted on the shaft 161 secured in plate 160. When solenoid L11 is energized to actuate eject rolls 156, the register arm 186 is also actuated and displaced from the path of movement of the ejected card. After the card is ejected, the solenoid L11 is deenergized and pivot arm 158 is removed from the actuated position by spring 196.

In order to project a light image from a film frame on a card supported on the carriage, a rectangular aperture 194 is formed through the platen 174. The aperture 194 is of a dimension slightly in excess of that of the film frame area on a aperture card, and is positioned adjacent the frame area when the card is positioned on the carriage. For clamping the card in scanning position, there is provided a solenoid-actuated gate or pressure pad 202 whereby when the gate is positioned on a card held on the carriage, it securely presses the card against platen 174 so that the film frame is maintained in a vertical plane during the scanning operation. To enable insertion and removal of cards, the gate is pivotally mounted by a pin 197 to the platen 174. Prior to the actuation of a solenoid L13 which actuates the pickerknife 128 a solenoid L10 is energized to open gate 202. The solenoid L10 actuates an arm 193 pivotally secured to the frame which contacts a cam 199 secured to gate 202. When the solenoid L10 is energized, the gate is pivoted open about pin 197 by cam 199.

When gate 202 is opened by the action of solenoid L10 the incoming card has an unimpeded passageway onto the carriage. At the same time solenoid L11 is actuated moving the register arm 186 out of the path of the outgoing card and moving eject rolls 156 into contact with the card thereby ejecting the same. Solenoid L11 is then deenergized deactivating the eject rolls 156 and replacing the register arm 186 in the path of the card. Solenoid L13 is then energized feeding the next card. This card is fed into the feed rolls 140 and 142 and into the carriage 113 against stop 153. A solenoid L12 then actuates arm 104 pivotally mounted on the housing through an opening 106 therein which gives the card a movement to the right and registers the card against register arm 186. The gate is restored to closed position when solenoid L10 is deenergized, and a pair of leaf springs 201 clamp the card against the platen.

For driving carriage 113 during the scanning operation, there is provided a driving arrangement for moving the platen 174 and gate 202 at a predetermined, relatively slow speed during the "scan stroke," and at a relatively higher speed during the return stroke of the carriage. For this purpose, there is provided a belt 210 driven by the main drive, to effect a predetermined drive rate as will be explained more fully hereinafter.

Belt 210 continuously rotates a pulley 214 secured to shaft 212 which is rotatably mounted in the housing of the projector. Shaft 212 has a second pulley 215 secured thereto and is effective to drive the carriage 113 only during the scanning stroke. A belt 216 is mounted for movement between pulley 215 and a second pulley 218 rotatably mounted on shaft 220 also rotatably secured to the projector housing. Thus the belt drive 216 is continuously moving. To effect engagement of drive belt 216 there is provided a solenoid L5 that is mounted in the frame of the machine and has its armature 222 connected to one end of a lever 224 that is pivotally mounted near its other end on a pin 228 secured in the frame. At the extreme end 230 of lever 224 adjacent pivot pin 228 there is provided an actuator stop 232 rigidly secured to the carriage 113. When the carriage is to be actuated, the solenoid L5 is energized, to rotate lever 224 clockwise and drive end 230 clockwise to cause the lever 224 to pinch the belt between the end 230 thereof and a stop 232 secured to the carriage 113. This action of the lever 224 causes the carriage 113 along with the solenoid L5 and all its related mechanism to be driven along with the belt 216. The carriage is driven past the axis of the optical system at a rate directly proportional to the rotational speed of the drum in order to achieve exact synchronism between the moving card and the sensitized surface of the drum. An actuator block 240 is securely mounted on the carriage 113 between a start of scan stop 242 and an end of scan switch LS26 mounted on a stop 244. As the entire carriage 113 is moved during the scanning stroke block 240 is moved therewith from start of scan stop 242 to the end of scan switch LS26. When block 240 actuates switch LS26 a circuit to be described deenergizes solenoid L5 releasing lever 224 thereby returning the carriage by a spring 248 secured to the frame at one end and to the carriage at the other end. Carriage 113 is returned until actuator block 240 contacts stop 242. To cushion the return of the carriage, an air cylinder 249 is provided.

To enable scanning various size film frames on aperture cards, i.e., film frames corresponding to A, B, or C-size engineering drawings and thus have copies reproduced to coincide with the travel of different length sheet material onto which the powder image of the copy is to be transferred, the start of scan position and the end of scan position of the carriage can be varied to accommodate different scan lengths for the various size images on the aperture cards. To this end a voltage is set in the control circuit by depressing one of the switches in switch bank S17 on the main control panel according to the sheet size desired and aperture card being reproduced. From this setting a signal is supplied to a micropositioner K30 which is a very sensitive bidirectional error detector. Micropositioner K30 in turn sends a signal to motor B12 which drives a shaft 250 through a gear train 252. Shaft 250 is formed with right- and left-hand threads so as to move start of scan stop 242 and end of scan stop 244 which are threadingly received on the shaft 250 toward or away from each other thereby increasing or decreasing the scan distance. At the same time a gear 258 drives a linear potentiometer R21 in a circuit to be described. When the linear potentiometer is at the balance point, blocks 242 and 244 are in the proper position and the micropositioner deenergizes the motor. This scan position is maintained until another selection is made.

EXPOSURE APPARATUS

The exposure apparatus enables introducing two kinds of image exposures to the recording drum, one of which is for producing line copies and another which is for tonal patterns. As such exposure apparatus 340 comprises a pair of slit control arms 341, 343 extending across the width of the drum and are each secured at the ends thereof by support pin 345 which is received in a support bracket 147 mounted on the frame. It will be appreciated that the spacing between slit control arms 341 and 343 define an exposure slit within the light shield frame which slit is vertically adjustable relative to the frame by means of adjusting screws 349 which are received in support brackets 347 through elongated slots. Slit control arm 343 is formed with an extension 351 at the lower portion thereof which serves to support a plate 353 made of glass or the like which is provided with parallel opaque lines preferably about 50 lines to about 300 lines per inch thereby forming a screen. The opaque lines and the spacings between the opaque lines preferably being of equal width to provide a 50-50 ratio of clear and opaque areas. The opaque lines may be formed by ruling or photographically. Screen 353 is secured firmly to the extent 351 by means of guides 355, 357 the spacing between which forms still another slit opening in addition to the slit opening defined between control arms 341 and 343.

To enable precise optical alignment of the slits defined by the control arms 341, 343 with the centerline of the optical path, a space control and centering pin 361 mounted on a bracket 363 of the frame is positioned between the control arms which are restrained against the pin 361 by means of a spring 365 connected to the arms. To enable adjustments of the space control and centering pins 361 relative to the optical path, bracket 363 is secured to the frame by means of adjusting screws 367 through elongated slots 369 formed in the bracket. In this manner, precise alignment of the optical centerline is maintained at all times for the slit formed by control arms 341, 343.

When the slit control arms 341, 343 are in the optical position a line image will be formed and a developing material or toner will develop narrow lines and printed or typed characters, since this is where the electric fields are the highest and the lines of force most concentrated. On the other hand, large solid areas will not be produced as solid areas of toner but rather the toner will deposit heavily along the edges of these areas and very little or none will deposit in the centers which would be desirable in the solid area images or continuous tone images. In order to overcome this problem, a second slit containing screen 353 is moved into the optical path and the slit formed by arms 341, 343 is removed therefrom. This results in electrostatic images after exposure being subdivided into a line halftone pattern which can now be adequately developed by the development material to form solid area and continuous tone images since the screen breaks up the exposed areas into alternate lines of charge and no charge.

To accomplish this alternate mode of operation, a cam 371 which is pivotally mounted onto a cam shaft 372 by means of clamping screw 374 is pivoted into abutting contact with mounting bracket 363 thereby urging the mounting bracket and space control and centering pin 361 out of the optical path against the action of a spring 376 which tends to hold the bracket in a fixed optical position. By this arrangement slit control arms 341, 343 are pivoted about their support pins 345 and a slit containing screen 353 is moved into optical position. Cam shaft 372 is turned a predetermined arc by means of an actuating solenoid L15 which receives an actuating signal from a circuit to be described hereinafter. In this manner the position of the slit can be varied from line copy to half tone and solid area images. When the solenoid L15 is deenergized the actuating magnet of the solenoid will drop to its lower position thereby turning cam shaft 372 and hence cam 371 out of the path of the mounting bracket 363 allowing slit control arms 341, 343 to return to their original position due to the action of spring 376.

Another feature of the exposure apparatus is that exposure time is selectively controlled for the different machine speeds. This is particularly desirable in the production of line copy prints where high-speed recording machines are greatly in demand. As a consequence of this, it is possible to change the exposure slit opening of the slit formed by control arms 341, 343 to obtain still a second exposure time for high-speed operation. This is accomplished by camming members 385 mounted on brackets 363 which members are moved upward and downward into contact with pins 387 and 389 formed on slit control arms 341, 343 respectively. To move the camming member 385 in an upward direction mounting brackets 363 are connected to a rod 391 which in turn is secured to an actuator solenoid L9 which receives discrete electrical signals as will be described hereinafter. Rod 391 extends along the length of the slit opening and has pins 392 which are received in elongated slots 393 of brackets 394 secured to the frame. Upon receipt of a signal, solenoid L9 is actuated pulling rod 391 upwardly with pins 392 riding in slots 393. As a result camming members 385 urge pins 387 and 398 outwardly against the action of spring 365 thereby widening the slit opening. When the solenoid L9 is deenergized, rod 391 and hence pins 392 drop to their lowermost position as determined by the lowest portion of the slots 383 thereby moving camming members 385 out of contact with pins 387 and 389 on the slit control arms 341 and 343 thereby allowing the control arms to be drawn into their normal close position determined by the space control and centering pins 361 due to the action of spring 365.

SHEET FEED APPARATUS

The sheet feed apparatus feeds sheets automatically or manually as required for the desired machine operation. For automatic operation different size sheets are selected when the print-size buttons on the main control panel are pressed. Alternatively a machine operator can select the desired sheet size by selecting one of three sheet trays on the tray selector control of the sheet feed assembly. For an alternate mode of operation the automatic feed can be overridden and sheets fed manually at the option of the machine operator.

The feed apparatus generally comprises frame 401 supporting three trays, a top tray 402; a center tray 403 and a lower tray 404, each of which holds a stack of sheets and is adjustable for sheet size as will become more apparent hereafter. Desirably top tray 402 holds C-Size sheet which may run from 17 inches x 22 inches or 18 inches x 24 inches. Center tray 403 desirably holds C or B-size sheet which runs from 11 x 17, 12 x 18, 17 x 22, or 18 x 24. Lower tray 404 desirably holds A, B, or C-size sheet which run from 8½ x 11, 9 x 12, 11 x 17, 12 x 18, 17 x 22 or 18 x 24. Each tray is similarly constructed and interchangeable and hence only one of the trays need be described it being understood that all the tray function in a similar manner. The sheet tray comprises a base member 409 having a center channel in the form of a slot 415. A stack of sheets is positioned longitudinally and laterally on the try by means of margin guides 416 and 417 which are adjustably mounted on the tray by means of a shaft 410. Margin guides 416, 417 are adjustable longitudinally on the tray by a back guide assembly 418 which is adapted to be selectively positioned along the length of the tray in locating holes 411 which correspond to a particular sheet length. Back guide assembly 418 includes a back guide plate 419 which has guide members 422, 424 that are received in slot 415 and one or more pin members 425 which are adapted to be received in holes 411. To enable longitudinal positioning of back guide assembly 418, back guide plate 419 is lifted upwardly so as to remove the pin members 425 from holes 411 and then lowered to position the pin members into the particular holes for the corresponding length desired as conveniently indicated by guide lines and numerals etched in plate 409. For ease of location of the back guide assembly an indicator member 428 is provided to facilitate alignment with the guide lines.

To enable lateral adjustment of the margin guides each of the guides is bored to receive a detent 432 in the from of a ball which is biased by a spring 433 into one of the suitably positioned notches 412 formed on shaft 410 so that margin guide can be readily indexed by an operator into the desired position for the various sheet widths. To facilitate location of the margin guides, guide lines and numerals are etched in shaft 410.

Sheet separation is obtained by side frictional retention by means of a pair of pressure pads 434 made of rubber or other suitable material carried by margin guides 416 and 417. Pressure pads 434 are mounted in such fashion that they can be replaced whenever desired. To this end each pad 434 is secured as by cement to a carrier member 435 which is carried in a bracket member 436 formed as a bent leaf spring to normally bias the pressure pad against the side margin of the sheet stack. To facilitate placing or removal of a stack of sheets on the tray there is provided a cam 437 formed in lever arm 438 that is loosely journaled in the side of each margin guide whereby the free end of the bracket member 436 can be cammed away from the side of the sheet stack by rotation of lever arm 438 which has a lever portion 439 formed at one end thereof.

To assure the feeding of sheets singly from the stack there is provided one or more drag rollers 441 that is adjustably positioned when in its operative position to rest on the topmost sheet of the stack. Drag rollers 441 are rotatably journaled on a pair of arm members 443 rotatably mounted on shaft 410 on opposite sides of back guide plate 419. Each of the drag rollers 441 is preferably made as a solid piece and is arranged in its operative position adjacent to rear end of the sheet stack so that as a trailing edge of the topmost sheet of the stack is advanced only a short distance from under the drag rollers, they will be immediately effective to place a drag resistance on the next sheet to prevent its advance to any undesirable degree by friction from the topmost sheet advancing sheet. When a stack of sheets is to be inserted into the tray, drag rollers 441 are moved out of the way in an inoperative position by merely rotating the arm members 443 around shaft 410.

The tray is slidably supported in the frame by a right-hand bracket 446 and a left-hand bracket 447 which receive a bracket portion 448 secured to the frame. Detent members 449 are secured on each of the brackets 446, 447 at the ends to facilitate locking the tray in the frame but may be overridden for removal of the tray from the frame.

To feed sheets one at a time from the tray there is provided drive rollers 451 fixedly mounted upon a shaft 452 which is rotatably mounted in an arm 454. Drive rollers 451 are driven by a motor B8, B9, or B10 through a gear 462 which meshes with a gear 464 which is fixed to a shaft 466 journaled in arm 454, shaft 466 being connected to shaft 452 by a belt member 469. In this manner the motor which drives continuously imparts rotary movement to drive rolls 451 which serve to feed the top sheet by means of frictional contact therewith. Also connected to arm 454 are sheet guides 470 which serve to deflect the sheet toward the intended feed path. To enable free movement of the sheet after delivery to a sheet transport which moves it in timed relation to the movement of the drum past the processing stations, it is desirable that feed rolls 451 be lifted out of contact with the sheet. To accomplish this a solenoid L2, L3, or L4 is energized from a control circuit as will be explained hereinafter to rotate shaft 472 thereby raising the drive rolls as will become more apparent. A plunger member 473 of the solenoid is connected to an arm member 474 which receives one end of shaft 472. A clutch spring 476 is utilized to transmit the motion of arm 474 to shaft 472. In this manner rolls 451 are raised a fixed distance irrespective of the stack height. In order to adjust the fixed distance rolls 451 are raised, a bracket member 477 slidably mounted on the frame to preload the clutch spring 476 and is secured in place by screw 478. When the solenoid is deenergized, the plunger member 473 releases arm 474 thereby loosening the action of the spring 476 on shaft 472 and enabling the rolls 451 to return to their original position in contact with the topmost sheet of the stack. Located at the discharge ends of the trays are guide plates 479 which guide the sheets fed from each of the trays toward a common exit 480 where the sheet may be received and handled in a manner to be described hereinafter.

It is often desirable to go from an automatic sheet feed to a manual sheet feed whereby different size sheets may be inserted at the option of a machine operator. To this end a door panel 484 is pivotally mounted on the top of the frame to provide access to the path to common exit 480. Upon raising door panel 484 selector switch S25 is depressed for this operation. In this manner it is possible without stopping to reload sheets in any of the trays to feed one or more sheets to the machine. Upon closing door panel 484 a control member 486 serves to automatically reset the sheet feed assembly to the automatic mode of operation.

In order to rapidly load sheets into each of the trays simultaneously without incurring damage to the lead edge of the sheet stack, there is provided a rapid load mechanism 488. Rapid load mechanism 488 comprises a lift handle 489 which is connected to a slidable plate 490 which engages an extension of lifting collars 491 which are fixed to shaft members 472. Slidable plate 490 is secured to the frame by screw members 493 which are received through elongated openings 494 formed in the plate. When lift handle 489 is raised, shafts 472 are caused to rotate thereby raising rolls 451 from the trays. A locking element 495 is provided for holding lift handle 489 in the raised position. When the lift handle 489 is released from locking element 495, slidable plate 490 and rolls 451 return to their original position. A spring 496 relieves the load of slidable plate 490 from lifting collar 491 and also serves to maintain lifting handle 489 in the lowered position.

SHEET TRANSPORT APPARATUS

The sheet transport apparatus receives sheets from the sheet feed apparatus and transports the sheets past processing stations where permanent copy is produced on the sheets and finally delivers them to a copy receiving tray. Sheet transport apparatus 75 comprises a continuous chain conveyor 502 which carries one or more sheet gripping mechanisms 503 in a path between a front feed-in guide 504 and a rear feed-out drive mechanism 505 into a vertical transport mechanism 507 (FIG. 41) for delivery to the copy tray.

The gripping mechanism 503 includes side frame members 510 which are secured to the chain conveyor 503. A rear frame member 512 connects the side frame members 510 and is mounted therebetween. Attached to the rear frame member 512 and extending along the top of the gripping mechanism is a longitudinal strip of spring stock 514 formed with cutout portions 516 along the front portion thereof. Extending to the front portion of the side frame members 510 is the body 518 in the form of a piece of rigid material. Mounted for rotation within the body 518 is a rod 520 which can be moved in an arc of approximately 90°. Camming elements 532 are attached to either end of rod 520. Rod 512 is formed with an opening 524. It should be noted that body 518 is formed with openings 519 therein. The cutout portions of the stock 514 are positioned above these openings 519. A sheet lead edge control guide 521 is mounted within each opening 519 and is secured by a pin 523 which fits into an opening 525 in the guide 521 and an opening 527 in the body 518. A leaf spring 529 is positioned between the rear portion of the body 518 and the rear portion of the spring stock 514 to maintain the lead edge guide in contact with the rod 520.

The gripping mechanism 503 is actuated upon energization of a sensing switch LS24 which is energized by insertion of a sheet in a slot 524 of the rod 520. The sheet is inserted into slot 524 and after an appropriate time lapse, a lever 526 moves cam elements 532 which is moved pivotally about rod 520. Cam elements 532 move in a clockwise direction thus moving rod 520 in a clockwise direction to positively grip the sheet between upper surface 536 of the rod and the under surface of the extending portions 538 of the spring stock 514. The lead edge of the sheet is guided by guide 521 and moved into a position to be gripped by the edge 537 of the opening 524 in rod 520.

The chain conveyor includes a pair of endless roller chains 546, one on each side of the frame which passes from sprocket 562 carried by axle 564 over sprocket 566 and 568 carried by axles 570 and 572, respectively. Axle 570 supports a sheet lift mechanism 575 which serves to bring the copy sheet into contact with the drum at the image transfer station which will be described more fully hereinafter. Sprockets 566 and 568 guide the chains in a path tangential to the surface of the drum past the fuser and through the rear feedout drive mechanism 505 where the copy sheet is released from the gripping mechanism and moved into the vertical transport mechanism 507 as will become apparent hereinafter. The chains are then carried over and around a second sprocket 574 on axle 576 down to a sprocket 578 secured to a drive shaft 555 and then back to the sprocket 562 on axle 564.

Each set of sprockets is positioned on their respective shaft or axle to space the chains apart from each other by a distance greater than the length of the drum to utilize the full width of copy sheet. Chains 546 desirably carry two gripping mechanisms 503 which are spaced equally from each other along the length of the chains. The gripping mechanisms are positioned on the chains at right angles to the path of travel of the chains for movement therewith between feed-in guide 504 and the rear feed-out drive mechanism 505.

When a copy sheet is fed into the feed-in guide 504 a sensing switch LS24 activates a timer M5 of the circuit which enables a sufficient time to elapse to allow the copy sheet to be properly seated in the gripping mechanism. After an appropriate time lapse a signal is supplied to each of a pair of solenoids L6 and L7 to activate a cam of actuator 520 to close the gripping mechanism 503 thereby securing the sheet for transport through the processing stations.

As gripping mechanism 503 is moved by the chain conveyor 546 and approaches the drum, a sheet lift mechanism 575 supported on idler shaft 570 is actuated to control the height of the copy sheet at the image transfer station. To this end sheet lift mechanism 575 comprises a lever 612 which pivots about a pin 614 and which through a series of lever arms 616 and 618 is connected to a sheet guide member 620. Guide member 620 is pivotally mounted on a pair of mounting blocks 621, 622 which are secured to shaft 570. As mechanism 503 passes the sheet lift mechanism 575 the sheet guide member 620 is moved below the path of movement of the gripping mechanism by the action of actuating lever 612 and arms 616, 618. After the gripping mechanism passes actuating lever 612, guide member 620 is returned to its neutral position by a pair of return springs 624 secured to the brackets 621 and 622 to lift the sheet carried by the gripping mechanism into intimate contact with the drum. In this manner the proper positioning of the copy sheet is maintained to eliminate any lead edge deletion at the time of image transfer onto the sheet.

The sheet is transported past the fuser to the rear feed-out drive mechanism 505 where the sheet is released and caused to be driven onto vertical transport mechanism 507. To this end rear feed-out mechanism 505 comprises a knurled delivery roll 642 driven by a gear 643 which in turn is driven by another gear 644 which is driven by chain-driven sprocket 645 through a shaft 648. As gear 643 drives driven delivery roll 642, a driving force is imparted to an idler roll 640 having O-rings 650 mounted thereon.

To enable passage of the gripping mechanism 503 delivery roll 642 is moved out of contact with the idler delivery roll 640 by pivoting about shaft 649 through a swivel linkage 652 mounted on shaft 653 by the action of a solenoid when energized by a signal as will be described hereinafter. After the gripping mechanism has passed the delivery rolls, solenoid L8 is deenergized enabling the driven delivery roll 642 to engage the sheet and drive roll 640 to continuously feed the remaining portion of the sheet from the rear feed-out mechanism into the vertical transport mechanism for delivery to the receiving or output tray. As the gripping mechanism passes rolls 640 and 642 the sheet is released from the gripping mechanism by a camming member 660 which moves the mechanism to the open position by rotating cam elements 532 thereby releasing the sheet and readying the gripping mechanism for the next cycle.

After the sheet is released from the gripping mechanism 503, the sheet is elevated by a camming mechanism 665 to guide the leading edge into the vertical transport mechanism 507. Camming mechanism 665 comprises a lever 666 mounted on pins 667 which are supported by mounting blocks 668 which are retained on a shaft 670 by screws 671. Gripping mechanism 503 serves to actuate and position lever 666 to elevate the sheet along its transport path into the vertical transport mechanism. Lever 666 is returned to its neutral position by a spring 672 which is secured on shaft 670 and pins 667. In this manner camming mechanism 676 causes the leading edge to be controlled to prevent the possibility of the sheet wrinkling or folding as it is received in the vertical transport mechanism.

Vertical transport mechanism 507 which receives the sheet delivered from rear feed-out drive mechanism 505 comprises an array of endless driven belts 680 supported on idler pulleys 68 and which serve to transport the sheet to the receiving tray 20. One or more resilient fingers 685 serve to deflect the vertically moving sheet into a generally horizontal direction to facilitate entry of the sheet into the tray. Drive is imparted to the belts 680 by a drive belt 687 which drives a shaft 689 which is encircled by one set of the idler pulleys 681, the other set of pulleys being driven through suitable drive gears. Drive belt 687 is driven by the machine drive system through a pulley 691, which is fixed to a shaft 693, having a sprocket 695 thereon that is driven by a drive 696.

DRIVE SYSTEM (FIGS. 42, 43)

The recording system is capable of multiple-speed operation wherein the copy output or travel rate may be as much as doubled or quadrupled at the option of a machine operator. Desirably the reproduction of tonal images is accomplished at a low copy travel rate whereas line images may be reproduced at medium or high copy travel rates.

To effect the drive of the various system components including the card handling and scan apparatus, recording drum, sheet transport apparatus, and vertical transport mechanism, a unitary drive system is provided which has as the prime mover a multiple-speed motor B7 whereby the different copy travel rates are achieved. Mounted on the shaft 705 of motor B7 is a main drive belt 707 which runs on a main pulley 709 which drives a shaft 711 which has a gripper drive pulley 713 fixed thereto for driving the gripping mechanism 503 of the sheet transport apparatus as will become more apparent.

Chains 546 carrying gripping mechanism 503 are driven by drive sprockets 578 secured to drive shaft 555. Drive shaft 564 is driven by a sprocket 719 through a magnetic clutch L1 which comprises clutch plates 721,723. Clutch plate 721 is secured to drive shaft 578 for rotation therewith by a key 725 while clutch plate 723 is journaled by suitable bearings on the drive shaft 555 and carries a clutch adapter 727 supporting sprocket 719 which is driven by a chain 730. which in turn is driven from a shaft 732 carrying gripper pulley 734 driven by gripper drive pulley 713 through a belt 736. Thus clutch plate 723 is free to rotate on the axis of drive shaft 555 while clutch plate 721 remains stationary due to the friction of elements attached thereto. The magnetic clutch is coupled to the control circuit as described thereinafter the through brushes 738 bearing on suitable collector rings on clutch plate 721.

Drum 70 is driven from shaft 732 through a drum drive pulley 741 thereon which moves a belt 743 encircling a pulley 745 mounted coaxially with the drum. Drive is effected to the card handling and scan apparatus from an idler drive pulley 747 mounted on the drum shaft which pulley moves an idler belt 749 and idler pulley 751 which in turn drives a pulley 753 which is encircled by scan belt 210 which enables scanning of the aperture cards as previously described. As already mentioned, a sprocket 695 driven by chain 730 serves to drive the vertical transport mechanism. In this manner a multiple-speed unitary drive system is achieved for the recording system.

FUSER SYSTEM (FIGS. 28, 44, 45)

For permanently affixing powder images to the sheet material, a fuser system is provided which is capable of fusing high quality images even though different rates of travel and varying weights of copy sheet are utilized. The fuser apparatus 78 comprises a plurality of heater elements 765 as for example, nichrome resistance coils mounted in a reflector housing 766 and when energized by a control circuit (FIG. 44) radiate sufficient heat to fuse the image but do not go beyond a temperature which would char or otherwise at affect the quality of the image.

The circuit comprises a regulated, well filtered power supply 769 made up of diode CR1, power resistors R2 and R3, capacitors C1 and C3, and a zener diode CR2. It has been found that an output voltage from such supply of about 12 volts is satisfactory for this purpose. A unijunction Q3, resistors R4 and R6, trim pot R5, and a capacitor C4 serve to makeup a sawtooth oscillator 771 which generates a ramp signal for a purpose to be described. A capacitor C2 superimposes a 60Hz. Signal on base two of the unijunction Q3 to enable the sawtooth oscillator to be synchronized with the line voltage. The period of the sawtooth oscillator, which may be adjusted by varying R5, is any multiple of 16.666 milliseconds which is the period of 60Hz. This period must not be too short so that the power variation is too abrupt or too long so that the response of the system is adversely affected. It has been found that a period of 83.333 milliseconds or 5full AC cycles, or 10 half AC cycles is desirable for sheet travel rates of from 10ft./min. to about 40ft./min.

The output of sawtooth oscillator 771 is coupled to an emitter follower stage 773 comprising a transistor Q4 and a resistor R7. Resistor R7 has a high resistance to enable a high input impedance of this stage whereby the sawtooth output of sawtooth oscillator may be effectively coupled to the rest of the circuit without affecting oscillation. A transistor Q5 and a resistor R8 are included in emitter follower stage 773 to provide an impedance match to the circuit output. A resistor R9 and a trimpot R11 enable the amplitude of sawtooth oscillator 771 to be varied, it being understood that increasing the amplitude of the sawtooth oscillator decreases the circuit gain, and decreasing the amplitude of the sawtooth oscillator increases the gain. Resistors R12 and R13, which are of equal value serve to bias the sawtooth oscillator so that it floats at approximately 6volts.

It will be noted that the output of emitter follower stage 773 is directly coupled to a zero cross pulse generator and comparator Q8 for a purpose to be described hereinafter.

For setting the fusing system set points for the different copy travel rates, a set point network 775 is utilized which includes a single thermistor T1 and three associated voltage dividing networks. A first voltage dividing network comprises a trimpot R17, pot R10, a resistor R46, and a resistor R14. This particular voltage dividing network is used for a low copy travel rate. A second voltage dividing network comprises a trimpot R21, pot R15, a resistor R47, and a resistor R18 and is used for a medium copy travel rate. In like manner a third voltage dividing network comprises a trimpot R25, pot R16, and a resistor R22 and is utilized for a high copy travel rate. It should be noted that each of the voltage dividing networks is coupled to the zero cross pulse generator and comparator Q8 through switch S15-2C. Pots R10, R15, and R16 are called "set point verniers" and are provided for manual set point adjustment. Pots R10, R15 and R16 enable an operator to manually vary the set point at each copy rate over a predetermined fine range for optimum fusing. As a result the fusing system can accommodate varying paper stocks, varying ambient conditions or any other factor which would necessitate a higher or lower set point. In addition trimpots R17, R21 and R25 are provided for initial calibration at the time of manufacture.

As previously described Q8 is a zero cross pulse generator and comparator which compares inputs from the emitter follower stage 773 and the set point network 775 and provides an output to drivers Q6 and Q7. When the voltage output of the set point new network is higher than the ramp signal provided from emitter follower stage 773, the output of Q8 is inhibited (FIGS. 45 b—e). However, when the ramp signal exceeds the output voltage of the set point network, (FIGS. 45 f—k), Q8 is not inhibited. The output of Q8 is coupled to drivers Q6 and Q7 which in turn fire triacs Q1 and Q2 when the output of Q8 is not inhibited. In this manner when the resistance of thermistor T1 varies due to varying temperatures in the fuser, a varying power output is produced from Q1 and Q2 to maintain the predetermined fuser set point.

To enable extra power on the start of each run after a standby or cold start RC combinations R29, C6; R29, C7; and R29, C8 are provided. This is accomplished when relay K102-1A closes by shorting capacitors C6, C7 or C8 to ground. When this occurs the voltage input to Q8 from set point network 775 is lowered for an exponential time period and the output power is 100percent for the duration of this time period. It will be understood that capacitor C9 bypasses the 60Hz. picked up in the lines.

Heater elements 765 are nichrome resistance coils, a portion of which are controlled by a triac Q1 and the remaining portion by another triac Q2. For a low copy travel rate only those heater elements controlled by triac Q2 are utilized. For the medium and high copy travel rates all the heater elements are energized, it being understood that the set points between medium and high speed are different. A switch S15-2B coupled to switch S15 on secondary control panel 27 serves to enable selection of power from one or both of triacs Q1 and Q2.

It should be understood that thermistor T1 is mounted under the sheet flow path toward the input end of the heater elements and it recessed in a mounting block 776 made of suitable material which is adjustably positioned below the sheet path as by a screw 777 and nut 778. In this manner the fuser system is better able to maintain proper set points for varying sheet lengths and weights.

A set point ready print circuit 780 is provided to signal machine control when the proper set point has been reached. To this end ready print circuit 780 comprises a diode CR4 and a capacitor c14 which makeup DC power supply. Resistors R35 and R36 make up a divider network which reduces this supply voltage to a suitable value. A resistor R34 serves as a current limiter in series with photocell lamp modules V1 and V2 for a purpose to be described. A typical photocell lamp module for use in the circuit is manufactured by Clairex Corporation, New York, N.Y., under the trademark of Photomod 0CLM4120. A firing circuit made up or resistors R44, R45 and R40 a zener diode CR6, and a capacitor C10 is used to control SCR1. When SCR1 fires set point readiness is indicated to machine control through a relay K101. When the machine is turned on under cold start conditions all the power appears across the heater elements. When the temperature in the fuser approaches the set point temperature, the power starts to cutback i.e., the triacs Q1 and Q2 are not on for the full 83.333 millisecond period. It may then be said that when the triacs begin to cut back, set point has been reached. If the machine is being operated at the high copy travel rate and it is turned down to a medium or low copy travel rate, the triacs turn completely off, and do not begin to turn on again until the lower set point is reached. Thus three conditions exist: (1) the triacs are fully off, (2) the triacs are fully on, and (3) the triacs are partially on. When the triacs are partially on, the fuse is at the approximate set point temperature. The ready print circuit 780 will not allow the machine to print until proper set point is reached, either from a cold start of or from a higher set point temperature to a lower set point temperature. When both V1 and V2 are on, the resistance in the charging path to capacitor C10 is reduced. As a result, C10 charges, zener diode CR6 breaks down and SCR1 turns on which energizes relay K101 which indicates to machine control that set point has been reached. Conversely when either V1 or V2 is off, relay K101 is not pulled in. It will be noted that zener diode CR6, capacitor C10 and resistor R40 provide a suitable delay after set point is reached and V1 and V2 turned on.

During normal operation the resistance of the thermistor T1 is varying constantly due to copy sheet flow through the fuse. This causes the power into the fuser to vary continuously. As stated earlier, as the resistance of T1 increases the power output increases and inversely, as the resistance decreases the power output decreases. If the thermistor "opens," i.e. it's resistance becomes infinitely large, the system loses control and full power would be dumped into the heater elements. To eliminate this problem, an open thermistor detector circuit 785 is provided. Circuit 785 is not connected until the ready print relay k101 is energized, thus eliminating the possibility of falsely detecting an "open" thermistor when a cold machine is initially turned on. We when a cold machine is turned on, the resistance of thermistor T1 is of a very high value such that a false condition would exist if open thermistor detector circuit 785 were connected. Assuming the machine is at set point temperature and relay K101 is pulled in, the voltage across the thermistor T1 is approximately 1volt. If an "open" occurs, this voltage increases to the value of the supply voltage. When this occurs, a zener diode CR7 breaks down turning on Q9 which activates a relay K103. Relay K103 signals machine control through a relay K39 that an "open" thermistor has occurred; which removes all power from the control circuit.

MACHINE OPERATION (FIGS. 47—54)

A clearer understanding of the operation of the apparatus described above and of the electrical circuit controlling the various elements can best be obtained by reference of the schematic wiring diagrams of FIGS. 48—54 and the actuable switches and signal lights of the electrical circuit being illustrated on the drawings of the control panels as shown in FIGS.

3, 4, and 5. Since the present invention is not concerned with certain specific xerographic processing apparatus, a detailed description of this apparatus is not considered necessary but reference is made to U.S. Pat. No. 3,062,109 to Mayo et al.

On the control panel the ON-OFF switch S1 when pressed ON starts the machine for the automatic printing operation. Once actuated the machine will assume a "standby" condition wherein all the functions of the machine are off except at the fuser heater and an exhaust fan will continue to operate. A START PRINT switch S7 when pressed pulls in a relay K23 which in turn starts the sheet feed apparatus and turns on the projector lamp DS2 through relay contact K31-1 and starts timer M13. Copy sheet is now fed from one of the trays 402, 403 or 404 of the sheet feed apparatus depending on which size sheet has been preselected by depressing print size switches S17 on the control panel. A copy sheet is now fed past sheet detector sensor switch LS24A which in turn starts a timer M5 and turns off timer M13. If a sheet fails to appear timer M13 would pull in a relay K8 which would stop the machine and light lamp DS3. The sheet continues to feed into the gripping mechanism 503 until timer M5 times out at which time sheet feed ceases and gripping mechanism solenoids L6 and L7 are actuated thereby gripping the copy sheet and pulling it along the transport path past the processing stations. A STOP PRINT switch S21 when depressed actuates a relay K4 which drops out relay K23 taking the machine from a printing to a standby condition. When this occurs, the machine will go into a "shut-down" condition when a timer M4 times out which takes approximately 4½ minutes. ON-OFF switch S1 when pressed OFF drops out a relay K1 which then serves to turn off or stop the entire machine immediately in the event that an emergency requires this action or from the "standby" condition at the end of a day. The number of copies to be made for each aperture card 114 is selected by turning knobs S10 and S11.

Before the machine may be actuated all of the inner locks switches must be closed which include LS41 on the projector cover, LS42 on the card handling and scan apparatus, LS2 on the rear door, LS3 on the rear door, LS40 on the vertical transport mechanism, and LS39 on the vertical transport mechanism door. This provision is made not only from the standpoint of safety but also to cause a proper circulation of air through the machine by fans driven by fan motors B3 for the fuser heater, B4 and B5 for the exhaust blowers, and B1 for the projector blower. In addition to these inner lock switches just mentioned a drum inner lock switch LS4 which is located behind the drum should be also closed upon installing the drum. A developer housing inner lock switch LS5 is also closed by securing the developer housing in its proper operating position.

With main relay K1 closed, power is provided through the main circuit wires W1, W13 and W205 for supplying power to main drive motor B7; cortron power supply PS1; discharge lamp DS1; brush motor B2; toner dispenser motor B11; card feed motor B13; card eject motor B14; indicator lights DS5, DS6, DS8, DS9 on the main control panel; shut down timer M4; the fuser controller and all the fan motors previously mentioned. When a ready lamp DS4 on the main control panel turns on, the machine is ready for operation which is then accomplished when START PRINT switch S7 is pressed.

When START PRINT switch is pressed the card feed cycle of card handling and scan apparatus begins by turning on program timer M3 which serves to energize in timed sequence the solenoids L10, L11, L12, and L13 associated with the apparatus. Also copy sheet is fed into gripping mechanism 503 is transported by the sheet transport apparatus past the processing stations. Connected to chains 546 of the transport apparatus are cam elements 801 which serve to actuate rail switches LS23, LS27, LS33, LS13, LS8, LS28, LS29, LS12, LS9 and LS22 which are located at predetermined positions along the transport path and which control the sequence of operation of the machine (FIGS. 46, 47.) The first rail switches contacted are paper margin rail switch LS27 or master margin rail switch LS33 depending on the position of the lead margin switch S16 on the secondary control panel. It should be understood that the lead margin switch S16 selects whether either a short margin or long margin is desired it being understood that for a short margin a copy sheet is utilized and for a long margin a master sheet is utilized as the output of the machine. Upon actuation of the paper margin rail switch LS27 or master margin rail switch LS33 as a relay K10 is pulled in which in turn energizes scan solenoid L5 and the shutter solenoid L14 of the card handling and scan apparatus and developer drive motor B6. A relay K9 serves to deenergize drive motor B6 when end of scan switch LS26 is actuated. As the transport continues on, rail switches LS13 and LS8 are actuated. Rail switch LS8 when actuated serves to pull in relay K3 which actuates a copy count circuit (not shown) and rail switch LS13 serves to actuate a billing circuit (not shown).

Cam element 801 next actuates rail switch LS22 which pulls in prefeed relay K22 which restarts the sheet feed drive motors B8, B9 or B10 according to the sheet feed size selection and also starts the prefeed timers M6, M7 or M8 to feed a second sheet while the first is being transported through the processing stations. When the timers M6, M7 or M8 time out, relay K22 is deenergized stopping the prefeed motors B8, B9, or B10. The cam elements next actuate rail switch LS28 which pulls in relay L24 and solenoid L8 of the rear feed-out drive mechanism 505. When relay K24 is pulled in, contact K24-1 is energized which serves to latch in both the relay K24 and solenoid L8. When this occurs, rear feed-out drive mechanism 505 is depressed permitting gripping mechanism 503 to be moved therepast and subsequently enabling the copy sheet to be released from the gripping mechanism by the action of camming member 660. As the chain conveyor 502 continues rail switch LS29 is actuated which opens contact K24-1 thereby removing power from relay K24 and solenoid L8 enabling the rear feed-out drive mechanism 505 to be positioned in its sheet drive position thereby driving the copy sheet in the vertical transport mechanism. Next a rail switch LS12 when actuated pulls in relay K38 which latches itself through contact K38-1 and switch LS38B which serve to start a timer M18 which will act to turn off the machine if a sheet jam occurs. If a jam occurs in the vertical transport mechanism where switch LS38 is positioned a timer M19 is started to perform the same function. Subsequently rail switch LS23 which is the home position switch is actuated causing a relay K25 to be energized. Relay K25 restarts the sheet feed drive motors B8, B9, or B10. In addition when home position rail switch LS23 is actuated a relay K6 is also energized through a contact K52B. With relay K6 energized a contact K61B is opened removing power from a magnetic clutch L1 which disengages chains 546 and gripping mechanism 503 from the main drive system. Thus gripping mechanism 503 is positioned to receive the next copy sheet for a repeat of the cycle just described.

The recording system is capable of multiple-speed operation for producing line and tonal copy and has for purposes of illustration machine speeds of 150, 300 and 600 for low, medium, and high, respectively on secondary control panel and a selector switch S15 for obtaining the desired speed. Upon positioning selector switch S15 to the desired speed, switch S15-1A and switch S15-1B are moved to an appropriate contact which corresponds to a one of the rates 150, 300 and 600 which contact then energizes appropriate coils of a three-speed synchronous motor B7. Main drive motor B7 serves to drive the main drive system including card scan, drum, sheet transport apparatus, and vertical transport mechanism through a belt and chain drive system. At the same time, a switch S15-2A closes a corresponding contact to the cortron power supply PS1 which changes the charging voltage on the drum, it being understood that a higher voltage is used for a higher drum speed. It has been found that a charge current ranging from about 10 to about 70 $\mu$a performs well for speed ranges from about 10 feed per minute to about 40 feed per minute. At the high rate a preclean charge current of about 10 $\mu$a is desirable while at low and medium speeds such preclean charge is not essential.

To achieve proper exposure for the different speeds a switch S15-4A closes an appropriate contact corresponding to the speed range which increases the projector lamp voltage by carrying the bias on triac Q1 as the drum speed is increased. Simultaneously a switch S15-3B closes to energize solenoid L9 of the exposure apparatus causing the exposure slit to be at its widest opening for the high rate. At the same time another switch S15-3A innerlocks with solenoid L9 through solenoid L15 which precludes the halftone exposure slit setting from being introduced into the optical path for these machine rates which are intended for line copy. Tonal copying is effected at the low copy rate by moving switch S32 on the secondary control panel to the tone position to energize solenoid L15 which actuates the exposure apparatus to the tone slit setting. It has been found that for multiple-speed operation optimum results for copy quality are obtained by utilizing a steel bead carrier material which insures good flow characteristics even at very high drum speeds. Typically carrier material size may range from about 400 to about 600 microns and preferably ranges from about 450 to about 500 microns.

The recording system utilizes different size copy sheets for reproducing drawings, as for example, A, B, or C. To accomplish this the card handling and scan apparatus is controlled to effect different scan lengths and the sheet feed apparatus is controlled to feed the appropriate size sheet thereby producing the copy size desired as determined by control switch bank S17 on the main control panel. Upon depressing one of the switches in the bank S17 an appropriate relay K34, K35, K36 or K36 is energizes which closes contact K36-3, K35-3, K34-3, or K37-3 which supply a reference signal across micro-positioner K30. Micropositioner K30 then energizes relay K29 or relay K28 depending on whether the scan is increased or decreased, respectively. Relay K28 or K29 closes contact K29-1 which when closed energizes scan position motor B12 which drives left- and right-hand threaded shaft 250 to open or close the start of scan block 242 and end of scan switch LS26. At the same time the shaft drives potentiometer R21 which serves to decrease the reference signal supplied to micropositioner K30 until such time as when the start of scan block 242 and end of scan switch LS26 reach the desired position. At this time no reference signal exists and the micropositioner K30 is deenergized. In addition when relays K34, K35, K36 or K37 is energized contacts K37-2, K35-2, K34-2, or K36-2 is closed thereby energizing the appropriate sheet feed motor B8, B9, or B10 and the appropriate sheet feed timer M6, M7, or M8 for the corresponding sheet size. At the same time a contact K37-1, K34-1, K35-1 or K36-1 closes a circuit to solenoid L2, L3, or L4 for controlling the appropriate drive roll lift mechanism. It should be noted that the sheet feed apparatus can be actuated directly from the sheet feed control panel by tray selector switch S31 which is positioned in AUTO, TOP, CENTER, or LOWER to energize solenoids L2, L3, or L4 to select the sheet feed tray 402, 403, or 404 as desired. At the same time, drive roll motors B8, B9, or B10 and timers M7, M8, or M6 are energized. In this manner a machine operator can select different trays to feed the sheet size desired notwithstanding pushbutton switch depressed of switch bank S17 on the main control panel. This operation is especially useful when a particular sheet tray is empty or for some other reason the other sheet trays are to be utilized without changing scan length or other units of operation.

An important feature of the recording system is that different size sheets can be fed manually as well as automatically and that automatic operation can be temporarily suspended to enable the operator to feed in sheets manually irrespective of the sheet size loaded in the sheet feed apparatus. To accomplish this door panel 484 of the sheet feed apparatus is opened and switch 25 on the sheet feed control panel is depressed. When S25 is depressed, a switch contact S25A removes all power from the sheet feed motors B8, B9, and B10 and timers M6, M7, and M8. At the same time a contact S25C removes all power from the solenoids L2, L3, or L4. Simultaneously a contact S25B removes power from the automatic timer M5 and energizes a timer M12 which enables a sufficient time of about 2 seconds in which a sheet fed by an operator to gripper mechanism 503 can be adjusted manually before the sheet transport apparatus takes over moving the sheet past the processing stations. When manual feed is over, normal automatic operation is resumed by closing door 484 which actuates a control member 486 to automatically reset switch S25 to the automatic position thereby energizing all of the control motors, timers and solenoids mentioned above. In this manner it is possible to shift from an automatic to manual operation for feeding in odd-size sheets and then resume automatic operation without the necessity of unloading and reloading sheet in the sheet feed apparatus.

While the invention has been described with reference to the structures disclosed herein, it is not confined to the details set forth; and this application is intended to cover such modifications or changes as may come within the purposes of the improvements or scope of the following claims.

I claim:

1. Fusing apparatus for fusing developed images on copy sheets moved through an automatic copying machine at variable rates comprising:

means for transporting copy sheets having fusible developed images thereon at variable rates past a plurality of heater elements, first circuit means for generating ramp signals of a predetermined duration, second circuit means including a thermistor responsive to changes in temperature and at least two voltage dividing networks each corresponding to a different fusing rate to emit reference signals indicative of a proper fusing temperature, pulse generator and comparator means responsive to input signals from said first and second circuit means to emit signals when the output signals of said first circuit means exceeds that of said second means and third circuit means including at least one triac coupled to at least a portion of said heater elements to receive signals from said pulse generator and comparator means and apply power to said heater elements in accordance with a preselected copy travel rate.

2. Apparatus according to claim 1 wherein said thermistor is positioned below the copy sheet travel path on a support member, and control means to move said support member toward and away from the travel path.

3. Apparatus according to claim 1 including circuit means for indicating a ready-print state to machine control when a proper temperature level of said heater elements is established.

4. Apparatus according to claim 4 including circuit means to override output signals from said second circuit means when an open thermistor condition exists.

5. Apparatus according to claim 1 wherein said first circuit means includes control means to effect different temperature levels for accommodating varying copy sheet stock and changes in ambient conditions.

PO-1050
(5/69)

UNITED STATES PATENT OFFICE
CERTIFICATE OF CORRECTION

Patent No. 3,558,853      Dated January 26, 1971

Inventor(s) Gary L. Schluntz

It is certified that error appears in the above-identified patent and that said Letters Patent are hereby corrected as shown below:

IN THE CLAIMS:

Claim 1, Column 20, Line 46, delete the word "triac" and substitute in place thereof --semi-conductor switching means--.

Signed and sealed this 25th day of May 1971.

(SEAL)
Attest:

EDWARD M. FLETCHER, JR.      WILLIAM E. SCHUYLER, JR.
Attesting Officer      Commissioner of Patents

PO-1050
(5/69)

UNITED STATES PATENT OFFICE
CERTIFICATE OF CORRECTION

Patent No. 3,558,853            Dated January 26, 1971

Inventor(s) Gary L. Schluntz

It is certified that error appears in the above-identified patent and that said Letters Patent are hereby corrected as shown below:

On the title page under "References Cited", delete all of the references cited, and substitute in place thereof --

UNITED STATES PATENTS

| | | | |
|---|---|---|---|
| 3,349,223 | 10/1967 | Barter............ | 219/505X |
| 3,398,259 | 8/1968 | Tregay et al...... | 219/388X |
| 3,417,226 | 12/1968 | Thomiszer......... | 219/505X--. |

Signed and sealed this 25th day of April 1972.

(SEAL)
Attest:

EDWARD M. FLETCHER, JR.            ROBERT GOTTSCHALK
Attesting Officer                  Commissioner of Patents